(12) United States Patent
Lau et al.

(10) Patent No.: US 11,520,311 B2
(45) Date of Patent: Dec. 6, 2022

(54) HIGH PERFORMANCE REMOVABLE STORAGE DEVICES

(71) Applicant: Microsoft Technology Licensing, LLC, Redmond, WA (US)

(72) Inventors: Michael Lau, Newark, CA (US); Julia Purtell, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 16/522,519

(22) Filed: Jul. 25, 2019

(65) Prior Publication Data

US 2021/0026328 A1      Jan. 28, 2021

(51) Int. Cl.
   *G05B 19/4155*     (2006.01)
   *H01R 12/72*       (2011.01)

(52) U.S. Cl.
   CPC ....... *G05B 19/4155* (2013.01); *H01R 12/721* (2013.01); *G05B 2219/49219* (2013.01)

(58) Field of Classification Search
   CPC ...... G05B 19/4155; G05B 2219/49219; G06F 1/1656; G06F 1/20; G06K 19/07732; H01R 12/721; H01R 12/72; H01R 12/712; H01R 13/00; H01R 13/506
   USPC .......................................... 361/679; 439/485
   See application file for complete search history.

(56) References Cited

U.S. PATENT DOCUMENTS

| | | | |
|---|---|---|---|
| 5,930,738 A | 7/1999 | Jones | |
| 6,003,068 A | 12/1999 | Sopko | |
| 6,424,532 B2 | 7/2002 | Kawamura | |
| 6,786,639 B2 | 9/2004 | Covi et al. | |
| 7,296,345 B1 | 11/2007 | Wang et al. | |
| 7,555,411 B2 | 6/2009 | Wang et al. | |

(Continued)

FOREIGN PATENT DOCUMENTS

| | | |
|---|---|---|
| EP | 1591949 A2 | 11/2005 |
| EP | 2317460 A1 | 5/2011 |
| WO | 2017123221 A1 | 7/2017 |

OTHER PUBLICATIONS

Heat Pipe & Vapor Chamber Heat Sink Design_pp. 1-28_Meyer_Jun. 2018.*

(Continued)

*Primary Examiner* — Timothy J Thompson
*Assistant Examiner* — Guillermo J Egoavil
(74) *Attorney, Agent, or Firm* — Ray Quinney & Nebeker P.C.; John O. Carpenter

(57) ABSTRACT

The present disclosure relates to a device for reading from and/or writing to a removable storage card. The device can comprise a housing including a wall defining a housing opening sized to receive a removable storage card. The device can also comprise a thermal management system attached to at least a part of the wall of the housing. Additionally, the device can comprise a biasing mechanism interoperable with the housing and configured to bias a card surface of the removable storage card into thermal communication with the thermal management system in response to insertion of the removable storage card into the housing opening. In some aspects, the biasing mechanism includes one or more elastic members configured to apply a biasing force to the removable storage card in response to the insertion of the removable storage card into the housing opening.

19 Claims, 13 Drawing Sheets

(56) References Cited

U.S. PATENT DOCUMENTS

| | | | |
|---|---|---|---|
| 8,030,719 | B2 | 10/2011 | Li et al. |
| 8,167,643 | B2 | 5/2012 | Yoshida et al. |
| 8,182,139 | B2 | 5/2012 | Fiennes et al. |
| 8,385,083 | B2 | 2/2013 | Chan et al. |
| 8,599,559 | B1 | 12/2013 | Morrison et al. |
| 9,488,529 | B2 | 11/2016 | Hong et al. |
| 10,205,277 | B2 | 2/2019 | Kimura et al. |
| 10,372,168 | B1 | 8/2019 | He et al. |
| 10,555,439 | B2 | 2/2020 | Johnson et al. |
| 2007/0027580 | A1 | 2/2007 | Ligtenberg et al. |
| 2007/0067136 | A1 | 3/2007 | Conroy et al. |
| 2007/0274046 | A1 | 11/2007 | Choi et al. |
| 2008/0025003 | A1 | 1/2008 | Nishizawa et al. |
| 2008/0182441 | A1* | 7/2008 | Kiryu ............... H01R 13/631 439/159 |
| 2009/0296351 | A1 | 12/2009 | Oki et al. |
| 2010/0022113 | A1 | 1/2010 | Ito |
| 2010/0055985 | A1* | 3/2010 | Hu ................. G06K 7/0021 439/626 |
| 2010/0194321 | A1 | 8/2010 | Artman et al. |
| 2011/0103027 | A1 | 5/2011 | Aoki et al. |
| 2011/0166828 | A1 | 7/2011 | Steinberg et al. |
| 2011/0213508 | A1 | 9/2011 | Mandagere et al. |
| 2011/0279969 | A1* | 11/2011 | Memon ............. H01L 23/427 361/679.47 |
| 2011/0301777 | A1 | 12/2011 | Cox et al. |
| 2013/0183862 | A1 | 7/2013 | Ni et al. |
| 2013/0295792 | A1* | 11/2013 | Naito ............... H01R 13/00 439/485 |
| 2014/0006818 | A1 | 1/2014 | Doshi et al. |
| 2014/0019418 | A1 | 1/2014 | Chu et al. |
| 2014/0048313 | A1* | 2/2014 | Pan ................ H01L 23/3677 174/252 |
| 2014/0148046 | A1 | 5/2014 | Naito et al. |
| 2014/0281609 | A1 | 9/2014 | Hanumaiah et al. |
| 2015/0134123 | A1 | 5/2015 | Obinelo |
| 2016/0056562 | A1* | 2/2016 | Mongold ............. H01R 12/91 439/246 |
| 2016/0292959 | A1 | 10/2016 | Salzman et al. |
| 2017/0150645 | A1 | 5/2017 | Huang et al. |
| 2017/0256143 | A1 | 9/2017 | Montero et al. |
| 2018/0006416 | A1* | 1/2018 | Lloyd ............... H01R 24/60 |
| 2018/0349243 | A1 | 12/2018 | Shin et al. |
| 2018/0350410 | A1 | 12/2018 | Curtis et al. |
| 2019/0273340 | A1* | 9/2019 | D'Inca .............. H01L 35/28 |
| 2019/0339888 | A1 | 11/2019 | Sasidharan et al. |
| 2020/0015385 | A1 | 1/2020 | Bucher |
| 2020/0077541 | A1 | 3/2020 | Sharf |
| 2020/0137896 | A1* | 4/2020 | Elenitoba-Johnson .................... H05K 7/20154 |
| 2020/0137922 | A1 | 4/2020 | Iino et al. |
| 2020/0225719 | A1 | 7/2020 | Scott, III |
| 2021/0026414 | A1* | 1/2021 | Lau ................ G06F 1/187 |

OTHER PUBLICATIONS

Heat sink—Wikipedia_pp. 1-17_Jan. 2019.*

"Notice of Allowance Issued in U.S. Appl. No. 16/248,139", dated Jan. 7, 2021, 9 Pages.

"Non Final Office Action Issued in U.S. Appl. No. 16/522,503", dated Jan. 1, 2021, 15 Pages.

"Notice of Allowance Issued in U.S. Appl. No. 16/248,139", dated Mar. 26, 2021, 8 Pages.

"Final Office Action Issued in U.S. Appl. No. 16/522,503", dated Mar. 23, 2021, 18 Pages.

"Non Final Office Action Issued in U.S. Appl. No. 16/522,503", dated Jul. 12, 2021, 13 Pages.

"Non Final Office Action Issued in U.S. Appl. No. 16/522,503", dated Feb. 18, 2022, 25 Pages.

Aqib, Muhammad, "How to Make an Arduino SD Card Data Logger for Temperature Sensor Data", Retrieved from: https://maker.pro/arduino/tutorial/how-to-make-an-arduino-sd-card-data-logger-for-temperature-sensor-data, Jul. 15, 2018, 13 Pages.

Aqib, Muhammad, "Use an Arduino to Make a Data Logger to Collect Temperature, Humidity, and Heat Data", Retrieved from: https://maker.pro/arduino/tutorial/how-to-log-temperature-humidity-heat-data-with-arduino-to-sd-card, Mar. 21, 2018, 14 Pages.

"International Search Report and Written Opinion Issued in PCT Application No. PCT/US20/012282", dated Mar. 18, 2020, 14 Pages.

"Non Final Office Action Issued in U.S. Appl. No. 16/248,139", dated Jun. 25, 2020, 24 Pages.

"International Search Report and Written Opinion Issued in PCT Application No. PCT/US20/036546", dated Sep. 8, 2020, 15 Pages.

"International Search Report and Written Opinion Issued in PCT Application No. PCT/US20/036721", dated Sep. 22, 2020, 18 Pages.

"Final Office Action Issued in U.S. Appl. No. 16/522,503", dated Oct. 27, 2021, 16 Pages.

* cited by examiner

HIGH PERFORMANCE REMOVABLE STORAGE DEVICES

BACKGROUND

The present disclosure relates generally to storage systems and, more particularly, to high performance removable storage cards and devices.

Some electronic devices, e.g., gaming systems, computers, tablets, and mobile phones, can have limited internal memory for storing files. To compensate for the limited internal memory, such devices can provide for expanding the storage capacity of the device through the use external, removable storage devices or memory cards, including but not limited to secure digital (SD) memory cards, micro SD cards, or compact flash (CF) memory cards. Although external memory cards can significantly increase the storage capacity of an electronic device, their performance can be limited by heat. An external memory card can increase in temperature through its own performance and/or any heat contributed from the electronic device in which it is inserted. If an external memory card increases in temperature by too great of an amount, it can negatively affect the performance of the memory card and/or the electronic device in which it is inserted.

As a result of an increase in speed and performance of electronic devices that utilize external storage devices, e.g., computers and gaming systems, there has developed a need for improved external storage devices and devices that utilize these external storage devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus is provided which may be a device for reading to and/or writing from a removable storage card. The apparatus can include a housing including a wall defining a housing opening sized to receive a removable storage card. The apparatus can also include a thermal management system attached to at least a part of the wall of the housing. Additionally, the apparatus can include a biasing mechanism interoperable with the housing and configured to bias a card surface of the removable storage card into thermal communication with the thermal management system in response to insertion of the removable storage card into the housing opening.

In another aspect of the disclosure, an apparatus is provided which may be a removable storage card. The apparatus can include a card frame including an insertion end and a non-insertion end, where the card frame comprises a first material having a first thermal conductivity. The apparatus can also include an end cap on the non-insertion end of the card frame, where the end cap comprises a second material having a second thermal conductivity that is less than the first thermal conductivity. Further, the apparatus can include a printed circuit board (PCB) mounted within the card frame, where the PCB includes a circuit, one or more signal or input/output (I/O) pins adjacent to the insertion end of the card frame and electrically connected to the circuit, and a data storage device electrically connected to the circuit, where the data storage device is operable to generate heat. The apparatus can also include a thermal interface material (TIM) positioned inside of the card frame and adjacent to the data storage device, where the TIM is configured to conduct the heat from the data storage device to the card frame.

In another aspect of the disclosure, an apparatus is provided which may be a computer system. The apparatus can include a computer device housing and a removable storage card reading and/or writing device. The removable storage card reading and/or writing device can include a housing including a wall defining a housing opening sized to receive a removable storage card. The removable storage card reading and/or writing device can also include a thermal management system attached to at least a part of the wall of the housing. The removable storage card reading and/or writing device can also include a biasing mechanism interoperable with the housing and configured to bias a card surface of the removable storage card into thermal communication with the thermal management system in response to insertion of the removable storage card into the housing opening.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
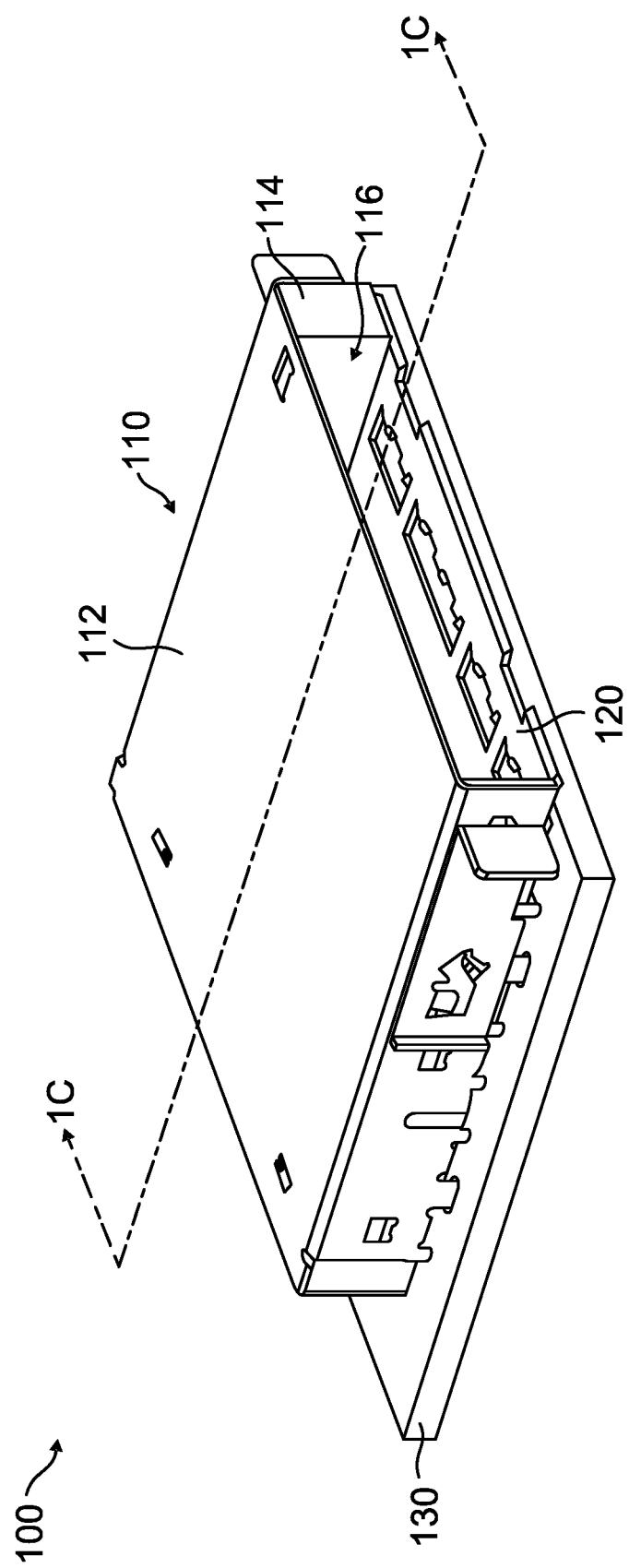
FIGS. 1A, 1B, and 1C are top perspective, exploded perspective, and left side cross sectional (along line 1C-1C of FIG. 1A) views, respectively, of an example device for reading to and/or writing from a removable storage card in accordance with one or more techniques of this disclosure.

Various aspects of a device for reading from and/or writing to a removable storage card, a removable storage card, and/or a computer system including the device and/or the removable storage card are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the apparatuses and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Removable storage devices or external memory cards can help to increase the storage or memory capacity of electronic devices. In some instances, the performance of removable storage cards and corresponding electronic devices in which they are inserted can be limited by the amount of heat produced by the card and/or device. For instance, the data transfer capability of some storage cards can slow down if the temperature reaches a certain threshold. Accordingly, it is important to dissipate or transfer heat away from the card when it is inserted into the device. In some aspects, a removable storage systems or subsystems that operate at a high power can experience intensified heat dissipation issues. For example, existing connectors or devices operating at a high power may not adequately dissipate the heat generated by removable storage cards that are inserted into the connectors or devices that read from and/or write to the removable storage card. As such, existing connectors or devices may not sufficiently dissipate heat to meet desired thermal specifications. Further, while this disclosure may describe the removable storage card as being used with a computer system, it should be understood that the computer system may include a variety of computerized devices, e.g., desktop or laptop computers, cameras, or gaming consoles, to name a few examples.

Typical connector thermal enhancements can be limited to a few components, such as changes to the connector shell and signal or input/output (I/O) pins. These signal pins in the connector, also referred to as a card reader/writer device, can make electrical contact with components inside of the card. For example, the card may include signal pins inside a frame or chassis. Some aspects of thermal enhancements may seek direct contact with the card, e.g., through the connector body. For instance, cards can be designed to dissipate, transfer, or reject heat via the connector. However, the removable storage card may not make sufficient mechanical contact with the connector in order to transfer or dissipate the heat required to meet desired thermal specifications. In some cases, the storage card may remain thermally insulated from the connector due to required mechanical clearances, such that a user can easily insert and remove the storage card. Accordingly, insertion and removal clearance requirements of the storage card may result in insufficient heat dissipation capabilities.

Some solutions may seek to increase the area of direct contact between the card and device in order to increase the overall heat dissipation. However, these solutions may violate insertion and removal clearance requirements of the card, or they may not be designed to make contact with the portion of the storage card that experiences high heat fluxes. Accordingly, some high speed card and connector systems may require unique thermal solutions. For example, as high speed systems may generate even more heat, and they may correspondingly require more efficient thermal dissipation solutions.

Aspects of the present disclosure can solve one or more of the aforementioned heat dissipation issues. For instance, aspects of the present disclosure can provide a more effective thermal dissipation, such as by making improved contact with a portion of the storage card that includes a heat generating component, such as but not limited to a top portion of the removable storage card. For example, aspects of the present disclosure can incorporate the use of thermal interface materials (TIMs) into connectors or devices to contact the heat generating component of the removable storage card. By doing so, the present disclosure can sufficiently improve heat dissipation capabilities of high performance removable storage devices.

Some thermal interface materials may not withstand the continuous and repeated insertion and/or withdrawal motions experienced by a removable storage card. For example, some types of heat dissipation components or TIMs may be damaged by this mechanical sliding action. However, the present disclosure can mitigate this potentially damaging movement with biasing mechanisms while at the same time increasing the thermal contact with the storage card, e.g., by moving the card towards the connector, or vice versa. For example, aspects of the present disclosure can include biasing mechanisms in the connector that aid in movement to reduce the friction on surfaces of a removable storage card.

Aspects of the present disclosure can optimize and improve a connector and memory card system with several features to enhance the thermal dissipation performance and storage performance, while still adhering to insertion and extraction requirements of the storage card. The present disclosure can also solve the thermal requirements for high speed removable storage card systems. Also, connectors and storage cards of the present disclosure can work in concert, e.g., as a system, to address these thermal requirements. As such, the present disclosure can also propose a card construction or body to address the thermal needs of high speed removable storage card systems. In some aspects, the present disclosure can transfer heat from one component in the system to another component. For instance, heat can be transferred from the card components to the case of the card, then from the case of the card to the connector, and then from the connector to the inside of the system. Accordingly, aspects of the present disclosure can optimize the thermal dissipation from a heat source via a thermal path. For example, heat may originate in the removable storage card the present disclosure may utilize aspects of the card and/or connector in order to provide an improved thermal dissipation path from the card.

Aspects of the present disclosure can also utilize a number of different embodiments in order to provide the enhanced the thermal dissipation. For example, one aspect can move or bias the storage card toward a thermal interface component, or vice versa. By doing so, the thermal interface may have improved contact with the card. As such, the present disclosure can create an improved thermal path to result in improved heat dissipation or rejection from the card. Further, aspects of the present disclosure can optimize a number of connector system issues, such as improving electrical connection, electrical shielding, and mechanical connection, in addition to improved thermal dissipation.

Figure 1B:
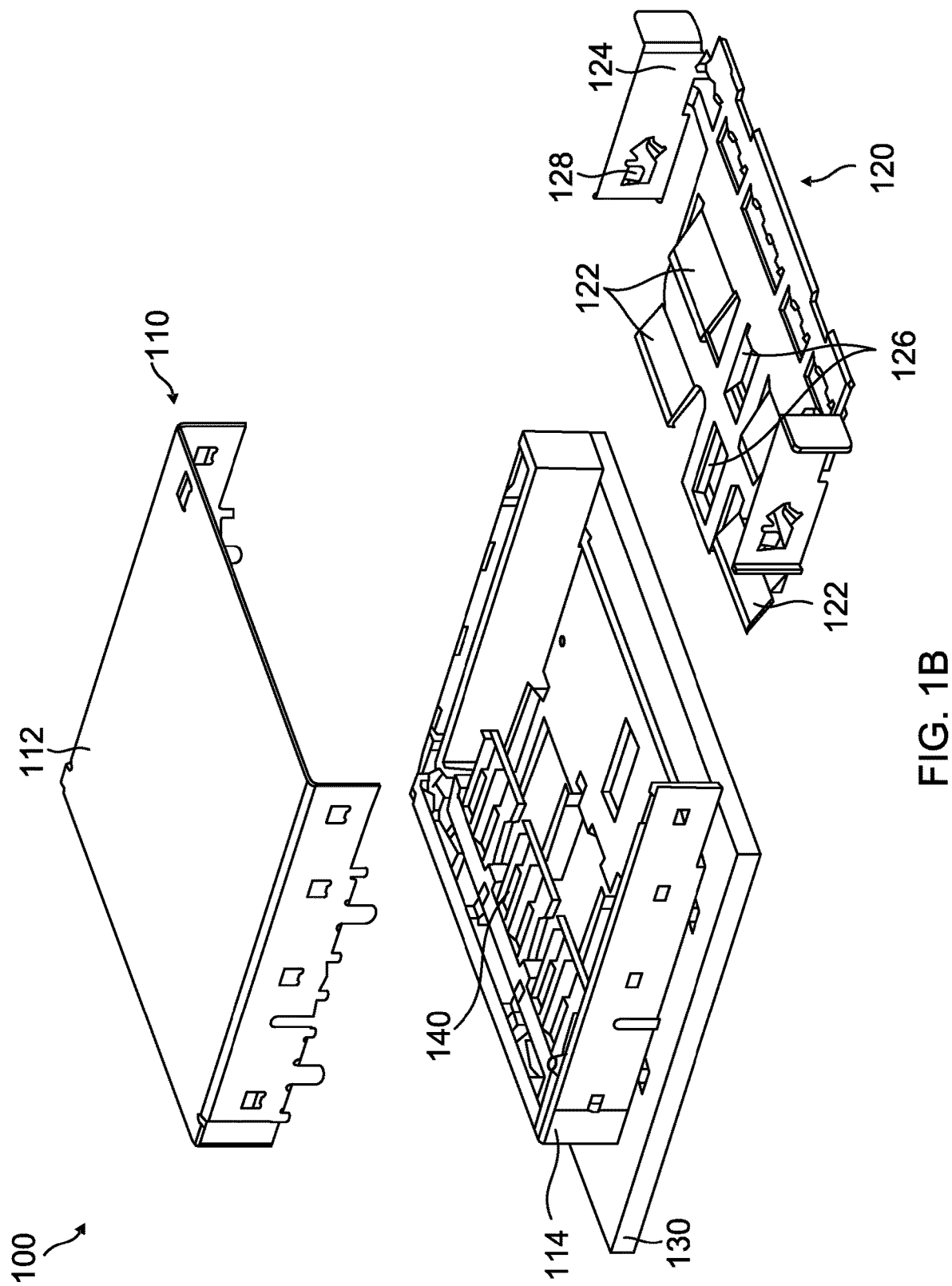
Figure 1C:
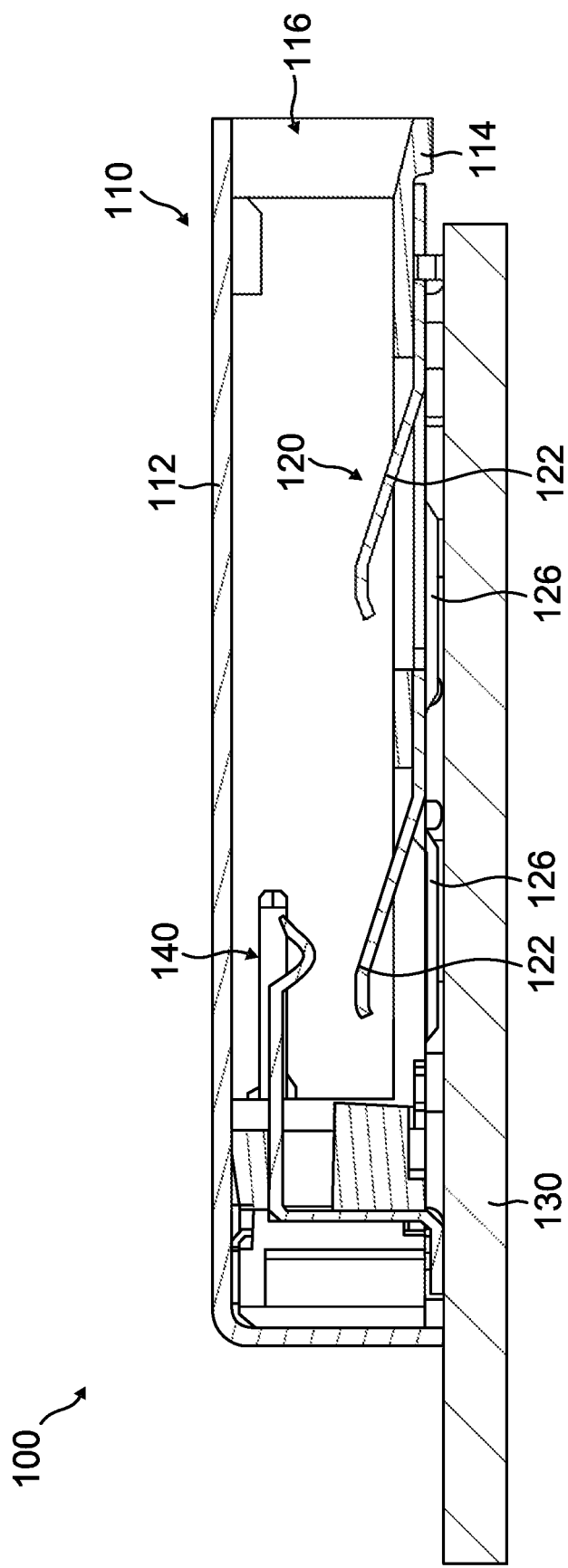

Referring to FIGS. 1A, 1B, and 1C, an example device 100 for reading to and/or writing from a removable storage card includes a connector housing 110 defined in part by a connector shell 112 that engages with a connector frame 114. As shown in FIGS. 1A and 1C, connector shell 112 and connector frame 114 can include one or more walls that form a housing opening 116, which may be sized to receive a removable storage card. For instance, a size of the opening 116 may be slightly larger than a size of a cross section of the removable storage card. The device 100 also includes a biasing mechanism 120, including elastic members 122, such as but not limited to springs, for applying a biasing force to an inserted removable storage card. The biasing mechanism 120 can be interoperable with, or attached to, the connector housing 110. For instance, biasing mechanism 120 can be attached between the connector shell 112 and the connector frame 114. For instance, in an implementation, the biasing mechanism 120 may have opposing side panels 124 (see FIG. 1B), including front flanges 128, and optional tabs 126, for mounting the biasing mechanism 120 within the connector housing 110. Additionally, device 100 includes printed circuit board (PCB) 130 on which the connector housing 110 is mounted, and which may include one or more electrical circuits. Further, device 100 includes signal or input/output (I/O) pins 140 (see FIG. 1B) attached on the connector frame 114 inside the connector housing 110 and in electrical communication with the one or more circuits of the PCB 130. In some aspects, device 100 can be referred to as a connector, a card reader/writer device, a connection device, or a host device.

As indicated above, a removable storage card 200 (not shown here, but see FIGS. 2A-C) can be inserted into the housing opening 116 of the connector housing 110. When the card 200 is inserted into the device 100, the signal or I/O pins on the card 200 can mate with the signal or I/O pins 140 to enable electrical signal communication between the card and the one or more circuits on the PCB 130. In some aspects, the biasing mechanism 120 can bias a storage card 200 that is inserted in the housing opening 116 toward the connector shell 112 of the connector housing 110 (see, e.g., FIG. 3). By doing so, the thermal contact between the card and the connector housing 110 can be improved. Accordingly, a memory card can be inserted into the device 100 and the biasing mechanism 120 can move the card toward and into contact with the connector housing 110 to dissipate heat from the card more efficiently. In other words, the biasing mechanism 120 can bias an inserted card toward the connector shell 112 and maintain a certain pressure or biasing force against the connector shell 112. In some aspects, a thermal management system can be mounted on or in contact with the connector shell 112, such that the biasing mechanism 120 helps to increase the contact or pressure between an inserted card and the thermal management system. In some instances, the thermal management system can include a thermal interface material (TIM), a thermal spreader, and/or or a heat sink. In some aspects, a TIM can be between the top of the connector shell 112 and a heat sink.

In some aspects, the connector housing 110 including connector shell 112 and connector frame 114 can comprise a thermally conductive material. For instance, when an inserted storage card contacts the connector shell 112, the thermally conductive material of the connector shell 112 can provide a thermal transfer path from the card. The connector shell 112 can also include a relative large surface area, as compared to a size of the removable storage card, which can help to create a better thermal path for heat dissipation. So the present disclosure can utilize the relatively large surface area of the connector shell 112 to improve the heat dissipation capabilities of the device 100. Connector shell 112 can also be thicker compared to typical connector shells in order to improve a heat sink and/or heat transfer capacity. In some aspects, connector shell 112 can be 0.5 mm thick, and in other aspects connector shell 112 can be 0.25 mm thick. However, connector shell 112 can be any appropriate thickness. Additionally, the thickness of the connector shell 112 can provide structurally stability, such that when an inserted card is repeatedly biased to contact the top of the connector shell 112, e.g., via the biasing mechanism 120, the connector shell 112 may not be damaged. Thus, the connector shell 112 can provide a good thermal path away from an inserted storage card, good heat spreading capabilities, and/or provide structurally stability.

As mentioned above, the present disclosure can include multiple components that can work in concert to optimize the thermal dissipation, e.g., biasing mechanism 120, connector housing 110, connector shell 112, and a thermal management system. The combination of these components can help to dissipate or transfer the heat produced by the card.

Biasing mechanism 120 can also include a thermally conductive material. As indicated herein, biasing mechanism 120 can include one or more springs or elastic members 122. In some aspects, biasing mechanism 120 can include four springs or elastic members 122. However, biasing mechanism 120 can include any appropriate number of springs or elastic members 122. As a storage card (not shown) is pushed into the connector housing 110, the one or more springs or elastic members 122 can provide a biasing force to move the card toward and maintain it being positioned against the connector shell 112. Accordingly, the springs or elastic members 122 can help to bias the card against the connector shell 112. As mentioned above, in turn, this helps to bias the card against a TIM and/or heat sink. In an implementation, the springs or elastic members 122 may be in the form of a leaf spring that extends above a bottom surface of the biasing mechanism 120 and/or the opening 116 and away from the open end of the opening 116, such that they define ramp-like shapes that deflect, providing a biasing force, when a card is inserted into the opening 116 of the connector housing 110. Also, in some implementations, the springs or elastic members 122 may be distributed across a surface defining the opening 116, e.g., a bottom surface in FIGS. 1A-1C, such that they provide a distributed biasing force on an inserted removable storage card to maintain an opposing card surface in enhanced thermal contact with the connector shell 112. In some aspects, the springs or elastic members 122 can be distributed at a plurality of positions based on the memory card size and/or aspect ratio.

Further, the biasing mechanism 120 and/or the one or more springs or elastic members 122 can move between different positions depending on whether or not a card is inserted into the opening 116. For example, biasing mechanism 120 and/or the one or more springs or elastic members 122 may have a first position when a card is not inserted into the device 100, and may move into a second position when the card is inserted into the device 100. In some aspects, the first position can be a resting position and the second position can be a compressed or stretched position. For example, the one or more springs or elastic members 122 can be compressed when the biasing mechanism 120 is in the second position after the card is inserted. Alternatively, in some implementations, the one or more springs or elastic members 122 can be stretched when the biasing mechanism 120 is in the second position after the card is inserted. Also, biasing mechanism 120 and/or the one or more springs or elastic members 122 may be on the upper or lower portion of the device 100, e.g., the top or bottom of connector housing 110. Moreover, the biasing mechanism 120 and/or the one or more springs or elastic members 122 can extend past a plane of housing opening 116 in the first position, e.g., a bottom plane in FIGS. 1A-1C, such that the biasing mechanism 120 and/or the one or more springs or elastic members 122 can extend into the opening 116 and interfere with a body of a removable storage card when the card is inserted into the housing opening 116. Then, in response to insertion of the card, the biasing mechanism 120 and/or the one or more springs or elastic members 122 can move to the second position.

In some aspects, the one or more springs or elastic members 122 can contact springs in the signal or I/O pins 140 when the card is inserted into the connector housing 110. Accordingly, the one or more springs or elastic members 122 of biasing mechanism 120 can press a memory card against the connector shell 112, as well as simultaneously pressing the card against the signal pin spring. In addition, using multiple springs or elastic members 122 can help to distribute the force on the memory card evenly, as well as reduce any extraneous or unwanted movement once the card is inserted, e.g., rocking movement of the card.

Additionally, the biasing force of different ones or different sets of the one or more springs or elastic members 122 can be different, and the biasing force from certain ones of the one or more springs or elastic members 122 may be greater than the force of the springs in the signal pins 140 in order to ensure an end of an inserted card is maintained in contact with a surface of the connector housing 110. In some aspects, the force of the one or more springs or elastic members 122 closer to the signal pins 140 may be stronger than the force of the one or more springs or elastic members 122 opposite the signal pins 140 and closer to the housing opening 116. In some alternatives, the difference in force between the one or more springs or elastic members 122 closest to the signal pins 140 and the one or more springs or elastic members 122 opposite the signal pins 140 may be equal to the force of the springs in the signal pins 140. Based on this configuration, there may be a uniform spring force on the inserted card. As such, aspects of the present disclosure can also utilize force distribution in the biasing mechanism 120 and/or the signal pins 140 in order to maintain even pressure on the card as it is inserted into connector housing 110.

This may overcome a potential thermal contact issue that may occur if there is not sufficient force from the biasing mechanism 120 to overcome the force in the signal pins 140. For instance, such a lack of force in the biasing mechanism 120 may result in an inserted card slightly tilting and/or creating a torque on the card. In turn, this may create a gap between the inserted card and the connector shell 112, e.g., between a portion of one end of the top of the card contacts the top of the connector shell 112 and another portion at the opposite end of the top, near the signal pins 140, is spaced apart from the top of the connector shell 112. As such, by overcoming the opposing spring force of the signal pins 140, the biasing mechanism 120 can cause an inserted memory card to uniformly contact the connector shell 112, which can provide improved thermal dissipation from the card. In some aspects, an inserted card may experience different forces as it is inserted into the connector housing 110. Accordingly, the insertion force requirements of a card may be dictated by the one or more springs or elastic members 122 and/or the signal pins 140.

Also, the forces of the one or more springs or elastic members 122 can be limited by threshold requirements of a removable storage card, such that they will not damage the card in any manner. For example, the card can include insertion and extraction force requirements. Moreover, when the card is inserted into connector housing 110, it can engage the one or more springs or elastic members 122 opposite the signal pins 140 prior to engaging the one or more springs or elastic members 122 closest to signal pins 140. By doing so, when inserted, the card may not deflect all the one or more springs or elastic members 122 simultaneously. In some instances, the one or more springs or elastic members 122 can be on all sides of biasing mechanism 120 and surround an inserted memory card, e.g., side panels 124 of biasing mechanism 120 can include the one or more springs or elastic members 122. In some aspects, the one or more springs or elastic members 122 can also have a grounding feature to electrically ground a connection with the card.

Side panels 124 can have a number of functions, such as structural and/or desense functions. For instance, side panels 124 can hold an inserted memory card in place. Additionally, one or both side panels 124 can include flange 128. In some aspects, flange 128 can interface with another component of device 100, e.g., a sidewall of the connector frame 114, or a gasket, which can prevent electro-magnetic interference (EMI) leakage.

Additionally, in some implementations, biasing mechanism 120 can also include tabs 126, which can increase the mechanical strength of the biasing mechanism 120 and/or which can provide mounting contacts with the PCB 130. Tabs 126 can also draw heat from the one or more springs or elastic members 122 or any other portion of biasing mechanism 120. For example, tabs 126 can dissipate heat from an inserted card into the PCB 130. Further, the biasing mechanism 120 including one or more springs or elastic members 122, side panels 124, and/or tabs 126 can include a thermally conductive material, such that these components can include thermal dissipation capabilities. Based on this configuration, the biasing mechanism 120 including one or more springs or elastic members 122, side panels 124, and/or tabs 126 can be used dissipate heat via the bottom surface of an inserted memory card, e.g., via PCB 130. As noted previously, biasing mechanism 120 and/or connector housing 110 can be connected to or mounted on the PCB 130.

In some aspects, PCB 130 can include components to improve thermal dissipation. For example, PCB 130 can include vias, e.g., channels of a thermally conductive material, running through the board. Connector housing 110 can also contact these vias, such that it can transfer the heat from the card to the vias in the PCB 130. Further, the vias can be inside the PCB 130 and extend from the top of the board, e.g., contacting the connector housing 110, through the board to dissipate heat away from the card.

Figure 2B:
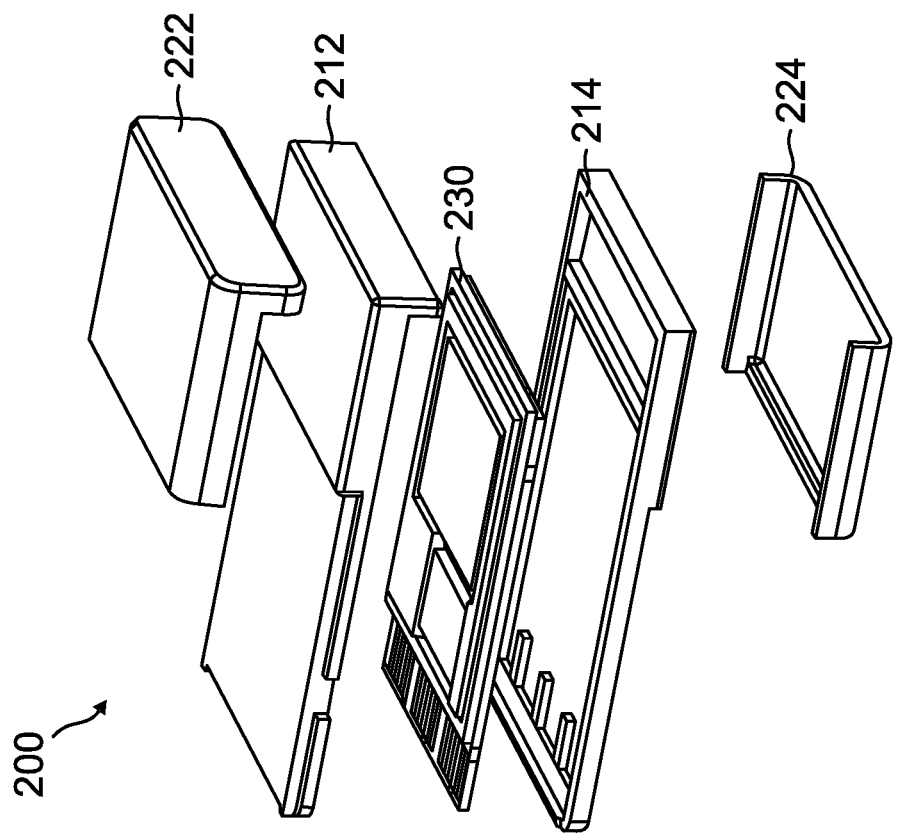
FIGS. 2A and 2B are top perspective and exploded perspective views, respectively, of an example removable storage card in accordance with one or more techniques of this disclosure.
Figure 2A:
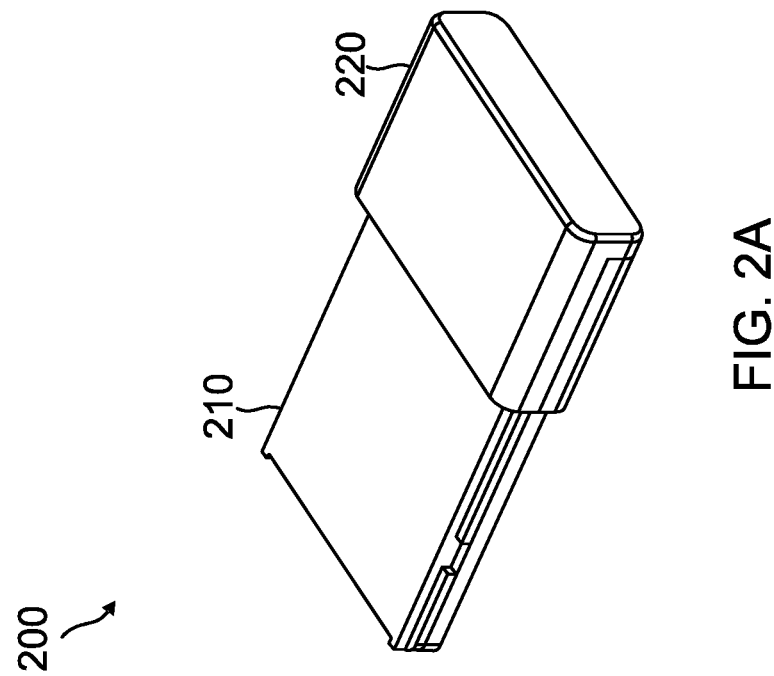

Referring to FIGS. 2A and 2B, an example removable storage card 200 includes card frame or body 210 including top frame 212 and bottom frame 214. As shown in FIGS. 2A and 2B, removable storage card 200 can also include end cap 220, which in an implementation may be formed by a top cap 222 connected to a bottom cap 224. Additionally, removable storage card 200 can include a storage component 230 housing a data storage or memory device, and/or a controller or processor or circuit.

Figure 2C:
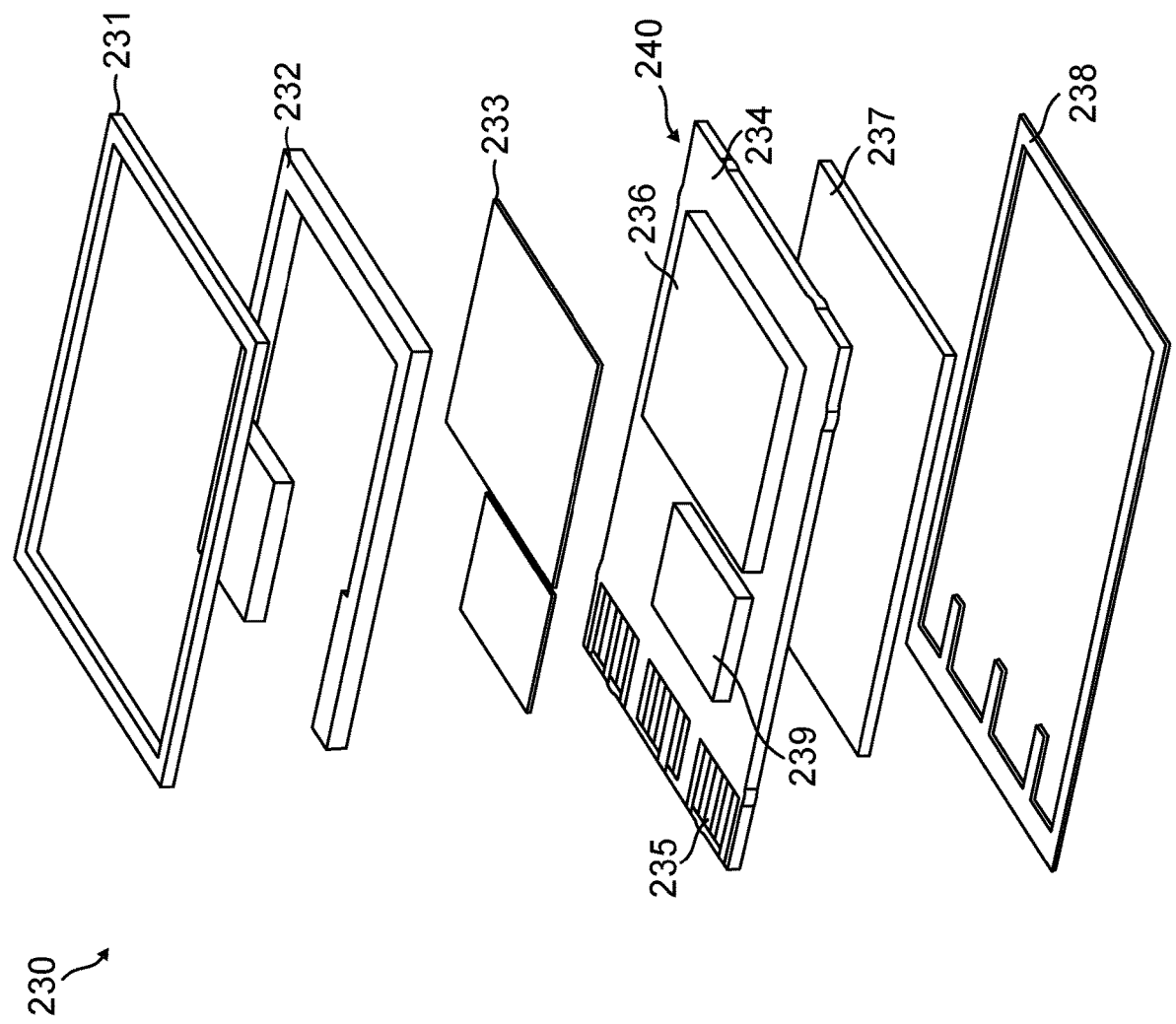
FIG. 2C is an exploded perspective view of an example storage component of a removable storage card in accordance with one or more techniques of this disclosure.

As shown in FIG. 2C, storage component 230 includes EMI gasket 231, TIM or potting component 232, TIM 233, PCB assembly (PCBA) 240, TIM 237, and EMI gasket 238. Also, PCBA 240 includes PCB 234, signal or I/O pins 235, not AND (NAND) memory 236, and circuit 239.

As shown in FIGS. 2A-2C, removable storage card 200 can also incorporate several thermal enhancement features that cooperate with the features of device 100 to increase thermal dissipation capabilities. For example, card frame 210 can include a thermally conductive material. For instance, both top frame 212 and bottom frame 214 can comprise a thermally conductive material. By doing so, card frame 210 can help to dissipate heat generated by the card, e.g., in the storage component 230. Card frame 210 can also help to provide a thermal path for heat dissipation.

Although the removable storage card 200 includes thermally conductive components, the card can also remain at temperatures that are safe for human touch. For instance, the removable storage card 200 can include high temperature thermally conductive components, but also include components that make the card safe to touch. For example, end cap 220 can comprise a material that is safe to touch, as compared to the potentially hot thermally conductive components, such as but not limited to a plastic or thermal insulating material. This configuration may allow the removable storage card 200 to be handled even when the adjacent card frame 210 is at a relatively hot temperature that would be uncomfortable to or that would burn a human. End cap 220 can also include an air gap, e.g., between top cap 222 and bottom cap 224, which insulates the cap from hot components of the card 200 during operation. End cap 220 can be partially exposed to contact while the card 200 is inserted into a host device.

As shown in FIG. 2C, removable storage card 200 and/or the storage component 230 can also include several types of thermal dissipation components or TIMs, e.g., TIM or potting component 232, TIM 233, and/or TIM 237. These thermal dissipation components or TIMs can be sized to contact heat generating components in order to help to dissipate heat generated by the card, e.g., in the storage component 230, as well as help to provide a thermal path for heat dissipation. In addition, the EMI gasket 231 and/or the EMI gasket 238 can help to electrically insulate the removable storage card 200.

In some aspects, the data transfer rate from the removable storage card 200 can remain constant. For instance, the data transfer rate may be constant even if the temperature of the card 200 increases. For example, if a storage system specification is met, then the data transfer from the card may not slow down when the temperature increases. Additionally, the removable storage card 200 can include certain insertion and/or extraction force requirements. Accordingly, the insertion and/or extraction force may be limited for the removable storage card 200. As mentioned above, the connector or card reader/writer or host devices herein, e.g., device 100 for reading to and/or writing from a removable storage card, can be designed to meet the insertion and/or extraction forces on the removable storage card 200.

Figure 3:
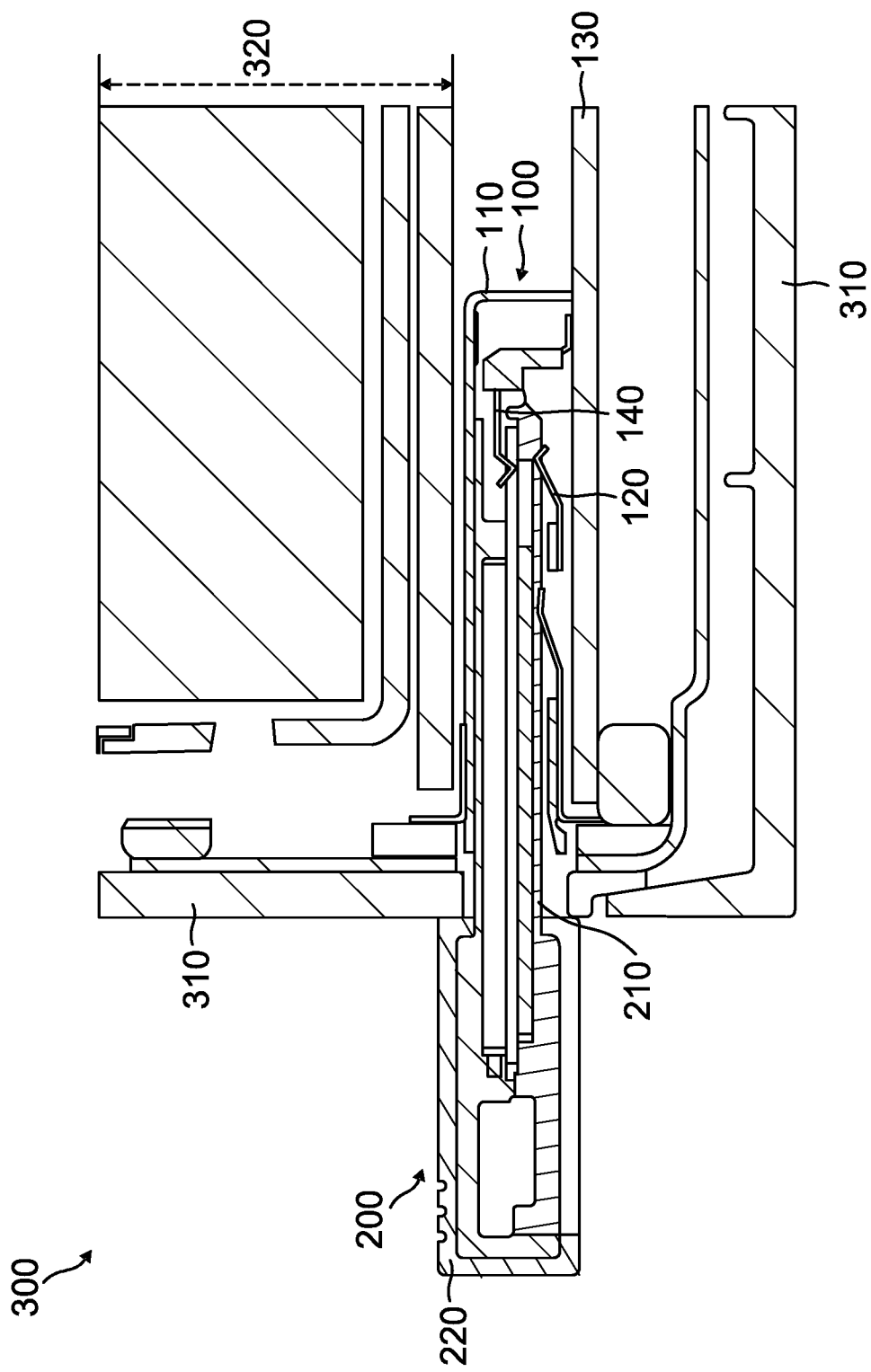
FIG. 3 is a right side partial cross sectional view of an example of a part of a computer system including a housing, a device for reading to and/or writing from a removable storage card, and an inserted a removable storage card in accordance with one or more techniques of this disclosure.

Referring to FIG. 3, an example computer system 300 includes a housing 310, device 100 for reading to and/or writing from a removable storage card, and removable storage card 200. Computer system 300 also includes a thermal management system 320, which can include a TIM, a heat spreader, and/or a heat sink, which can include a heat pipe or a vapor chamber. Computer system 300 can also include a chassis. In some aspects, thermal management system 320 can include a chassis. As indicated above, in some aspects, device 100 can include thermal management system 320. As shown in FIG. 3, device 100 includes connector housing 110, biasing mechanism 120, and PCB 130. As further shown in FIG. 3, removable storage card 200 includes frame 210 and end cap 220.

As shown in FIG. 3, the removable storage card 200 is inserted into the device 100, such that the signal pins of card 200 mate with the signal pins of device 100, e.g., signal pins 140. As mentioned above, upon insertion into device 100, removable storage card 200 can be biased by the biasing mechanism 120 against the connector housing 110 or connector shell 112. By doing so, the removable storage card 200 can be biased into thermal communication with the thermal management system 320. As a result of this biasing, the contact between the card 200 and connector housing 110 can be improved, which can correspondingly improve the rejection or dissipation of heat from the card 200. In particular, the one or more springs or elastic members 122 of biasing mechanism 120 can position the top surface of the top wall (in this figure) of frame 210 against the bottom, inner surface of the top wall of the connector shell 112 of the connector housing 110. The surface of frame 210 can then be maintained in thermal communication with the thermal management system 320. Accordingly, a thermal dissipation path can be formed from the card 200 to the connector housing 110, and then to the thermal management system 320 and to a chassis and/or housing 310.

As shown in FIG. 3, the thermal management system 320 can be between, and in contact with, the connector housing 110 and a chassis. Accordingly, thermal management system 320 can facilitate contact between the connector housing 110 and the rest of system 300, e.g., a chassis may connect with housing 310. The thermal management system 320, e.g., including a TIM, a heat sink, and/or a heat spreader, can be in a number of different positions in system 300. For example, thermal management system 320 can be on top of the connector housing 110, as well as on the bottom of the connector housing 110.

Additionally, the surface area of the connector housing 110 and/or thermal management system 320 can help to improve the heat dissipation from the card 200. As mentioned above, the surface area of the connector housing 110 and/or thermal management system 320 can be relatively large compared to the 200. This surface area of connector housing 110 can help to direct the heat from the card 200 to the thermal path, e.g., via the thermal management system 320. Further, as mentioned above, when the card is biased toward the connector housing 110, it can be held in a thermal contact position there with a certain biasing force provided by the biasing mechanism 120. Accordingly, aspects of the present disclosure can include dynamic thermal systems integrated with an inserted storage card.

As mentioned above, the biasing mechanism 120 can also serve as a secondary heat flow path from the card 200, which draws heat to the PCB 130 using vias and/or soldered contact points. Additionally, the thermal management system 320 can dissipate the heat from the card 200 in concert with other components, e.g., a chassis, housing 310, and/or any other components including a thermally conductive material. So the heat dissipation path from the card can include a chassis, housing 310, thermal management system 320 including a heat sink, a TIM, and/or a heat spreader, connector housing 110, biasing mechanism 120, and/or PCB 130.

As shown in FIG. 3, the thermal management system 320 can be between and/or connected to the connector housing 110 and a chassis. Accordingly, thermal management system 320 can help spread heat from the card 200 to a chassis. Also, a chassis can play a significant role in the spreading of heat from the card 200. For instance, a chassis can be connected to a number of other components in the system 300, such that it can dissipate heat from the card 200 in a number of different directions. Thermal management system 320 can also dissipate heat from the card 200 in concert with a chassis, or with another thermally conductive component.

As indicated above, aspects of the present disclosure can utilize a number of different components to dissipate heat generated by a storage card 200. In some aspects, the present disclosure may utilize a chassis by itself to dissipate heat, rather than use a chassis in concert with thermal management system 320. In some aspects, the present disclosure can spread or dissipate heat from card 200, as well as utilize convection to reject heat from card 200. As mentioned herein, thermal management system 320 can include a heat sink. In some instances, the heat sink of thermal management system 320 can include a heat pipe or a vapor chamber. For example, if power requirements are high, then the thermal management system 320 of the present disclosure may utilize a heat pipe or vapor chamber.

As mentioned above, thermal management system 320 can also include a TIM. In some aspects, the TIM can provide a connection and/or improve the interface between the connector housing 110 and a heat sink of thermal management system 320. In some instances, assembly requirements and/or mechanical tolerances may necessitate that the thermal management system 320 includes a TIM in addition to a heat sink. The TIM can also reduce any air gaps between connector housing 110 and a chassis, as air gaps can have a negative effect on heat dissipation. So the TIM can bridge a connection where components cannot make perfect contact. For example, the TIM can help to bridge an air gap based on flatness tolerances.

The TIM of thermal management system 320 can comprise a number of different materials. For example, the TIM can comprise a thermal sheet, thermal putty, thermal grease, and/or thermal pads. These TIM materials can be selected for the purpose of dissipating heat through other materials. The TIM can also comprise elastic features, e.g., to help bridge the air gap.

Figure 4A:
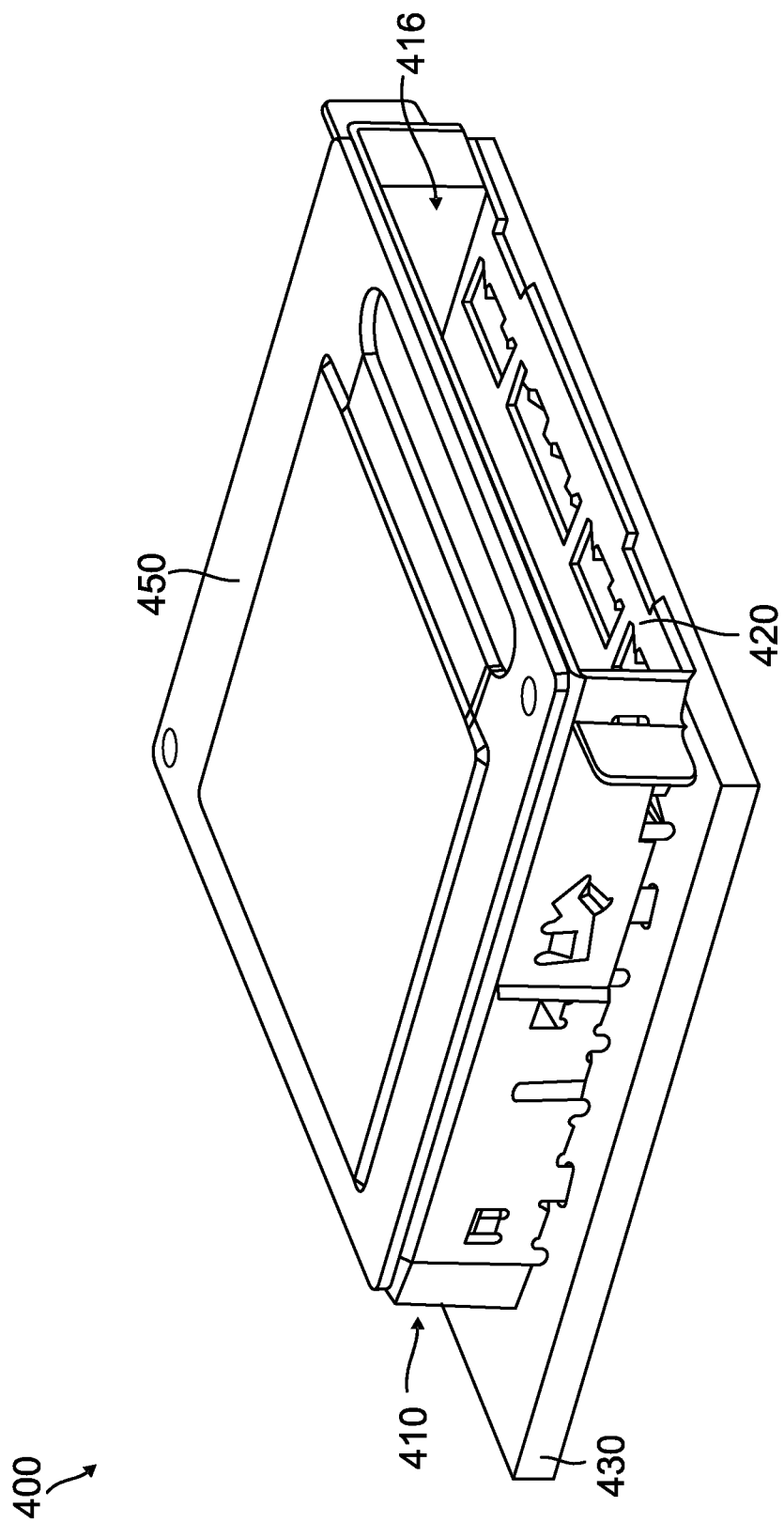
FIGS. 4A and 4B are top perspective and exploded perspective views, respectively, of an example device for reading to and/or writing from a removable storage card in accordance with one or more techniques of this disclosure.
Figure 4B:
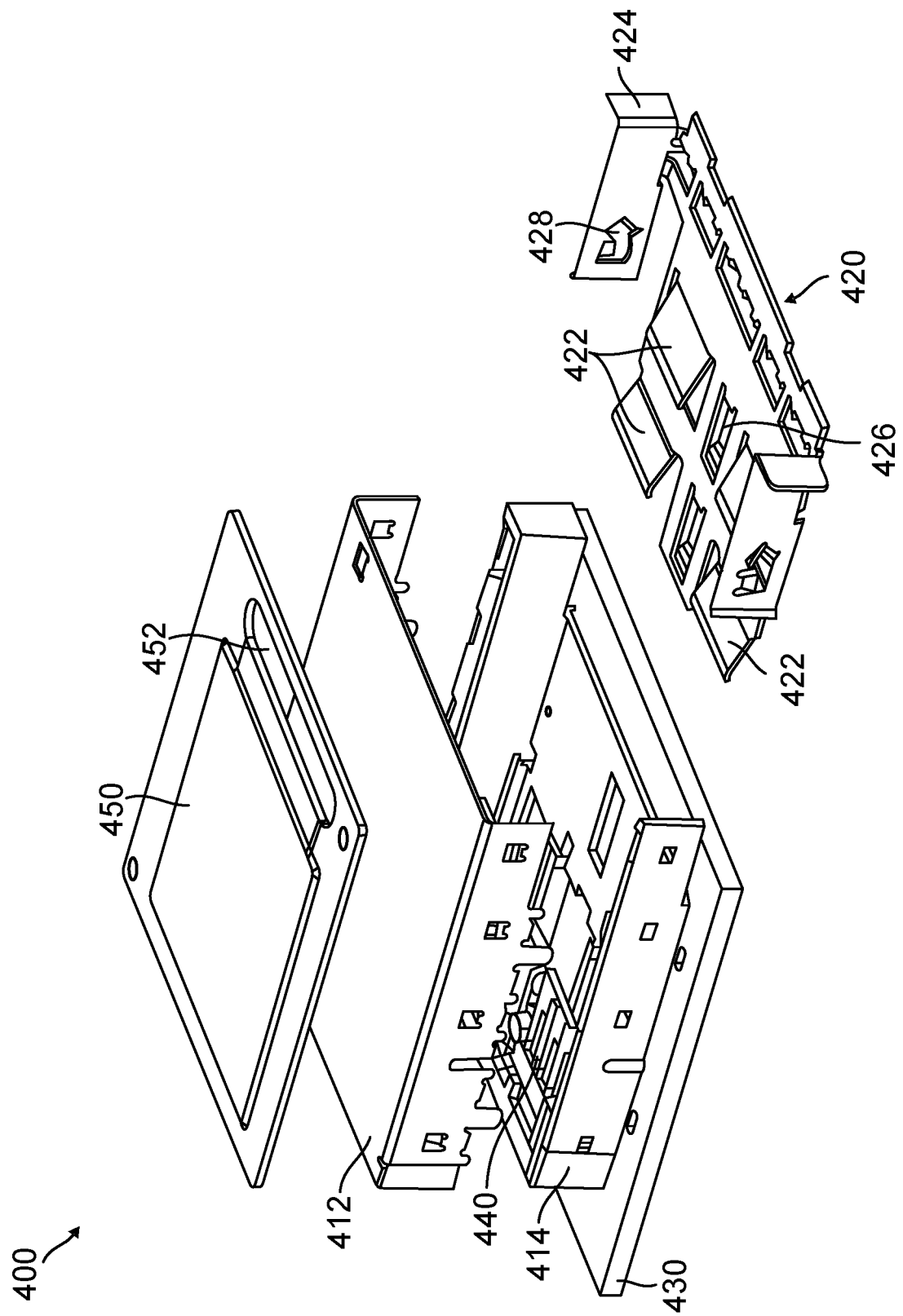

Referring to FIGS. 4A and 4B, an example device 400 for reading to and/or writing from a removable storage card similar to device 100, but further including a thermal slug 450 to help dissipate heat, e.g., produced by a memory card. Accordingly, slug 450 can comprise a thermally conductive material. Device 400 includes a connector housing 410 including a connector shell 412 and a connector frame 414. As shown in FIG. 4A, connector shell 412 and connector frame 414 can form housing opening 416. As shown in FIGS. 4A, and 4B, device 400 also includes a biasing mechanism 420 including springs or elastic members 422, side panels 424 including flange 428, and tabs 426. Additionally, device 400 includes PCB 430 on the connector housing 410. Also, device 400 includes signal or I/O pins 440 attached on the connector frame 414 inside the connector housing 410. As further shown in FIGS. 4A and 4B, biasing mechanism 420 can be interoperable with, or movably attached to, the connector housing 410. For instance, biasing mechanism 420 can be attached between the connector shell 412 and the connector frame 414. In some aspects, device 400 can be referred to as a connector, a connection device, or a host device.

As noted, device 400 in FIGS. 4A and 4B can be similar to device 100 in FIGS. 1A and 1B, but includes thermal slug 450 that can be on or connected to connector housing 410. Slug 450 can add a conductive material to device 400 that may be more thermally conductive than the connector housing 410. Thus, slug 450 can improve the thermal conductivity of device 400. Slug 450 can also include slot 452. The slot 452 can be used for mechanical clearance, e.g., to mechanically clear the connector housing 410 and/or to aid in positioning of the slug 450 relative to a surface of the connector housing 410.

Figure 5A:
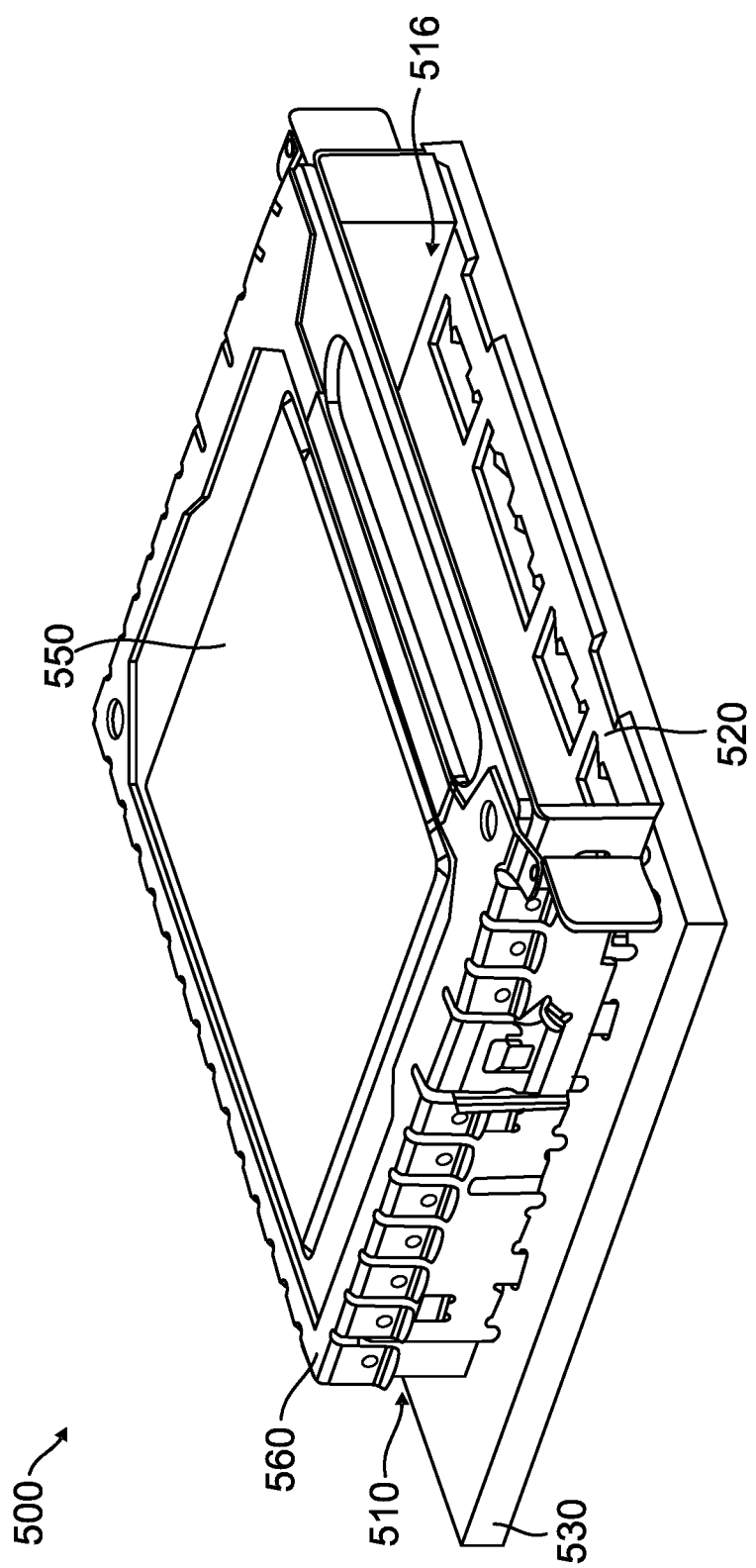
FIGS. 5A and 5B are top perspective and exploded perspective views, respectively, of an example device for reading to and/or writing from a removable storage card in accordance with one or more techniques of this disclosure.
Figure 5B:
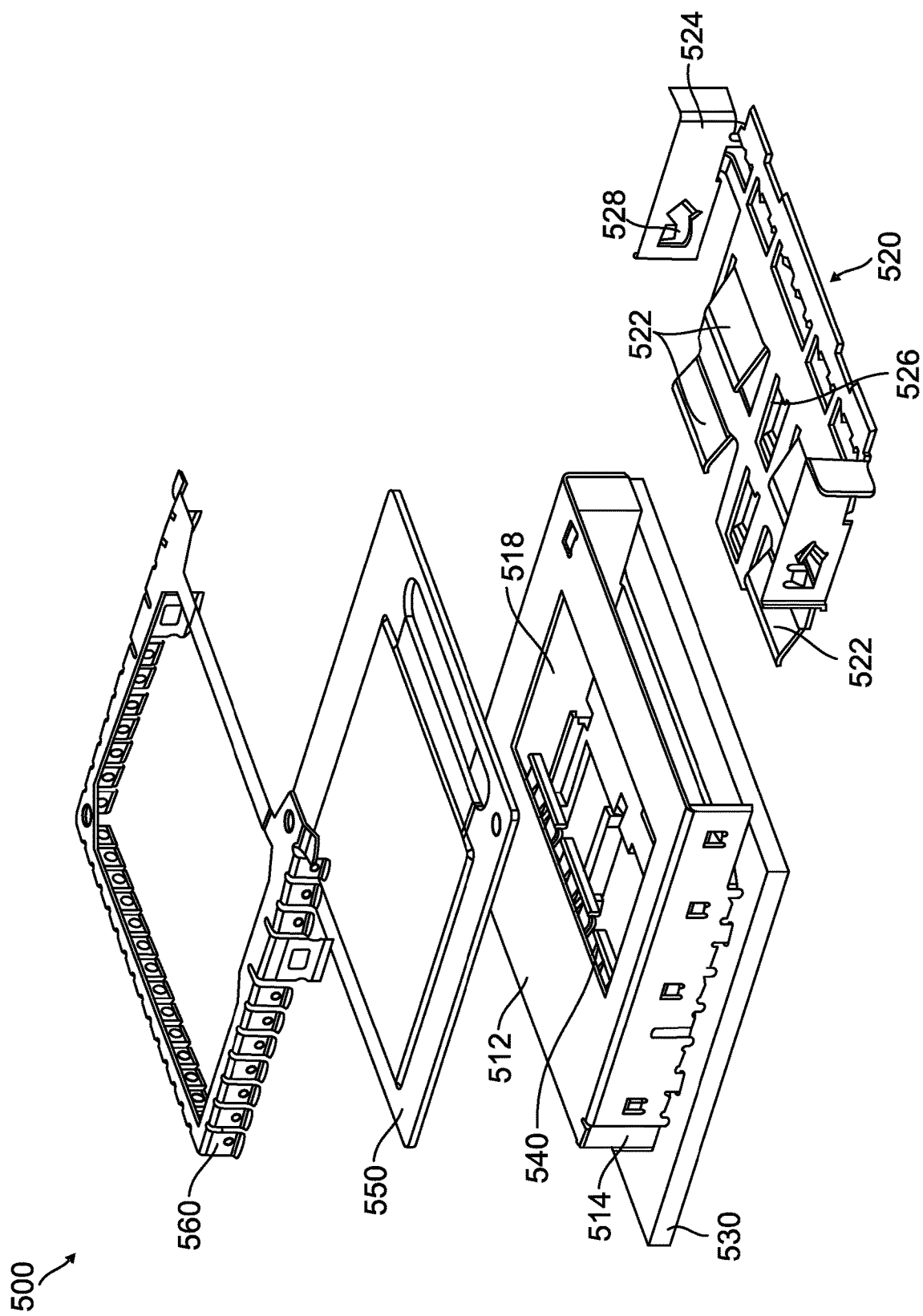

Referring to FIGS. 5A and 5B, an example device 500 for reading to and/or writing from a removable storage card, which can be similar to device 400 in FIGS. 4A and 4B but which further includes thermal slug 550 and shell or cage structure 560 to further enhance thermal dissipation. Device 500 includes a connector housing 510 including a connector shell 512, a connector frame 514, and window 518. As shown in FIG. 5A, connector shell 512 and connector frame 514 can form housing opening 516. As shown in FIGS. 5A, and 5B, device 500 also includes a biasing mechanism 520 including springs or elastic members 522, side panels 524 including flange 528, and tabs 526. Additionally, device 500 includes PCB 530 on the connector housing 510. Further, device 500 includes signal or I/O pins 540 attached on the connector frame 514 inside the connector housing 510. As further shown in FIGS. 5A and 5B, biasing mechanism 520 can be interoperable with, or movably attached to, the connector housing 510. For instance, biasing mechanism 520 can be attached between the connector shell 512 and the connector frame 514. In some aspects, device 500 can be referred to as a connector, a connection device, or a host device.

As noted, device 500 in FIGS. 5A and 5B can be similar to device 400 in FIGS. 4A and 4B, although slug 550 can be on or connected to connector housing 510 and shell 560 can be connected to slug 550. In some aspects, shell 560 can hold or mount slug 550 to connector housing 510. Also, shell 560 can include a thermally conductive material, such that shell 560 can help with heat dissipation in device 500. Shell 560 can also help to reduce electrical noise or radiation from signals high speed signals, such as EMI leakage. As such, shell 560 can include an EMI containment capability. In some aspects, window 518 may cause EMI leakage to occur, such that shell 560 can contain or reduce the EMI leakage, e.g., from the housing 510. Shell 560 can also help to close off any gaps in other components.

As shown in FIG. 5B, connector housing 510 may include a window 518, defined by one or more internal walls of the connector housing 510, to enable an inserted card to be biased through the window 518 and directly contact the slug 550. As such, window 518 can allow a storage card to directly contact the slug 550. By doing so, a memory card can more effectively dissipate heat to slug 550. In some aspects, the slug 550 can be more thermally conductive than the connector housing 510, so window 518 can help improve heat dissipation if the card can be biased directly against the slug 550. As mentioned above, the slug 550 can conduct and effectively spread heat from an inserted card.

Figure 6A:
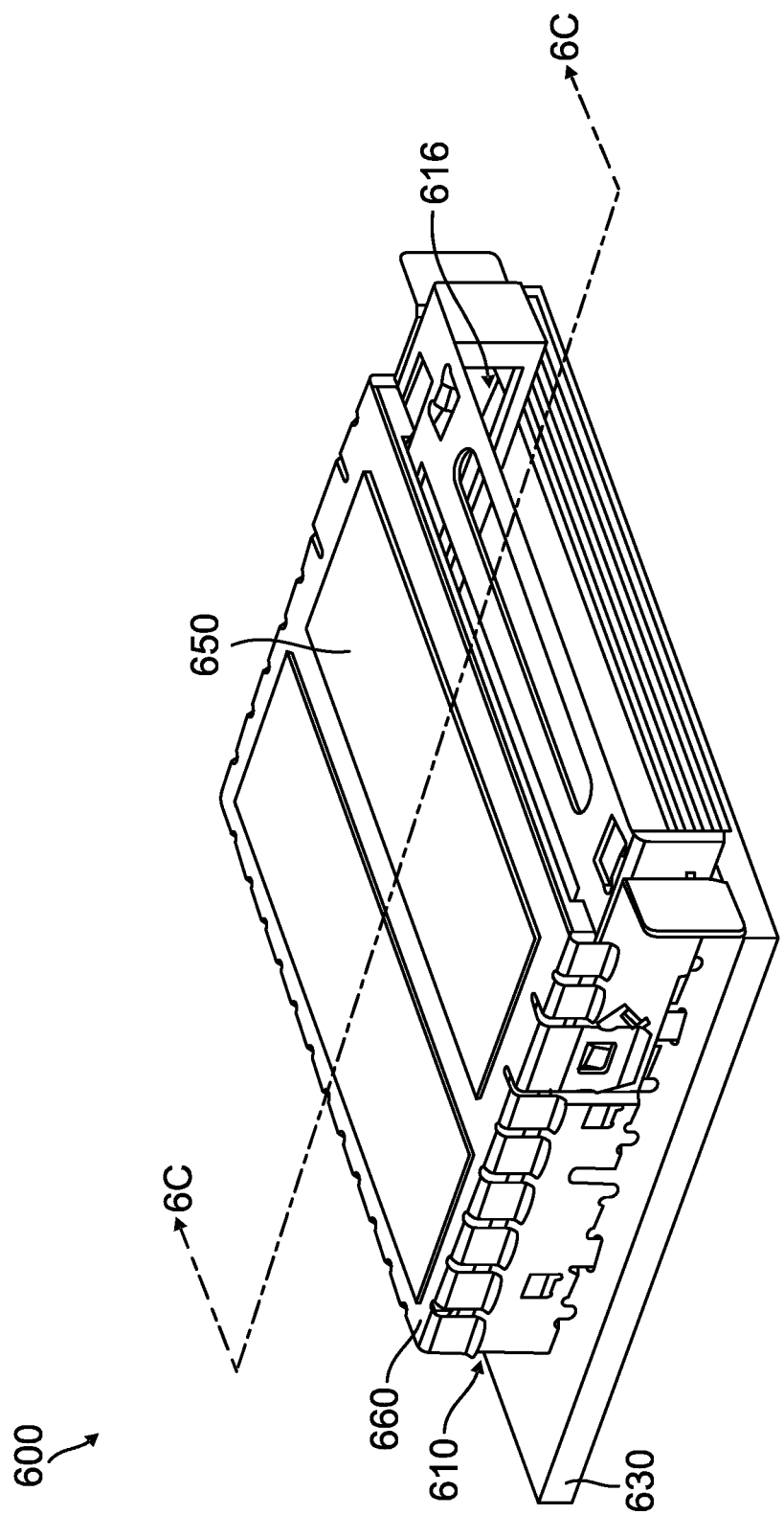
FIGS. 6A, 6B, and 6C are top perspective, exploded perspective, and left side cross sectional (along line 6C-6C of FIG. 6A) views, respectively, of an example device for reading to and/or writing from a removable storage card in accordance with one or more techniques of this disclosure.
Figure 6B:
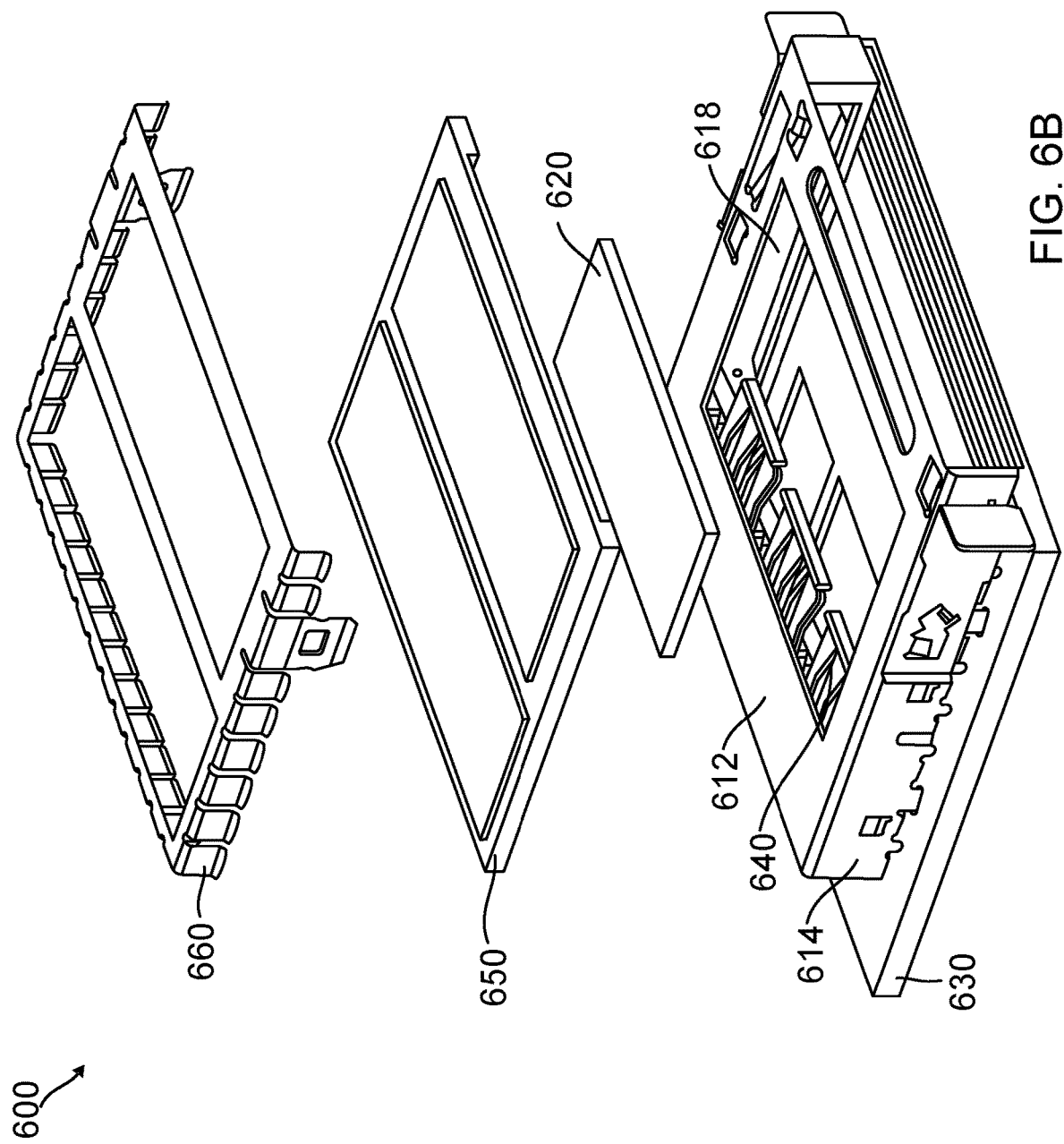
Figure 6C:
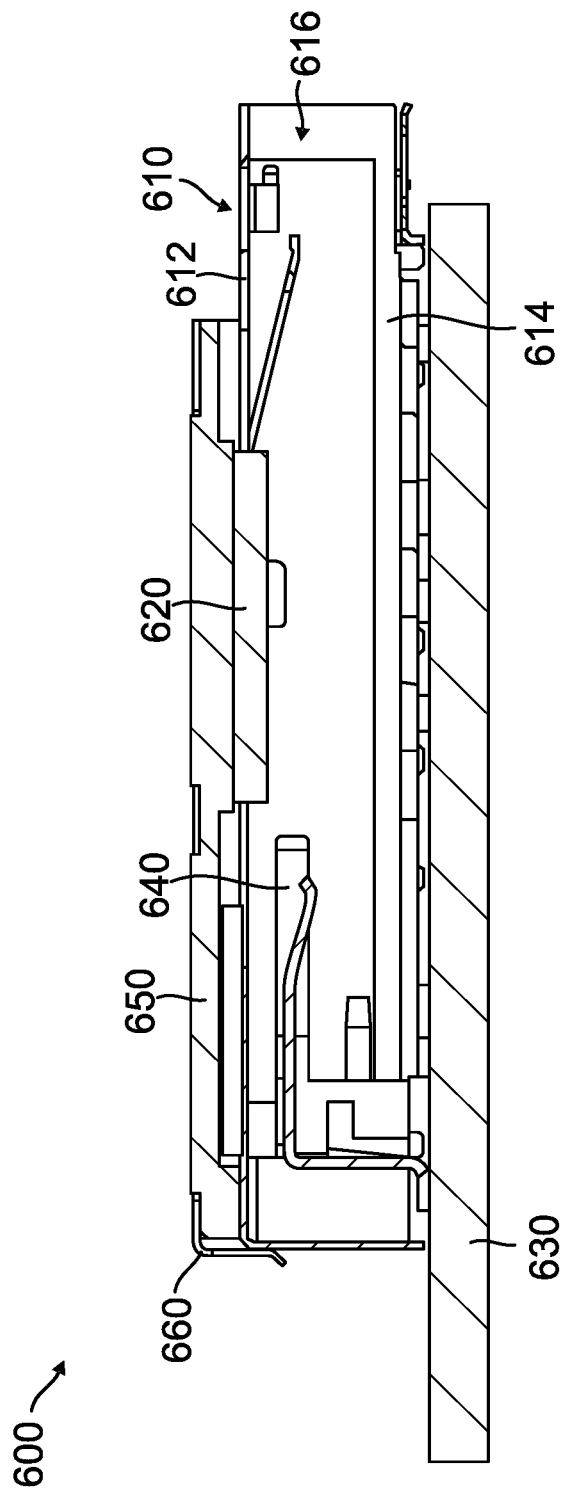

Referring to FIGS. 6A, 6B, and 6C, an example device 600 for reading to and/or writing from a removable storage card includes a connector housing 610 including a connector shell 612, and a connector frame 614, and window 618. As shown in FIG. 6A, connector shell 612 and connector frame 614 can form housing opening 616. Additionally, device 600 includes PCB 630 on the connector housing 610. Further, device 600 includes signal or I/O pins 640 attached on the connector frame 614 inside the connector housing 610. As shown in FIGS. 6A, 6B, and 6C, device 600 also includes a biasing or elastic mechanism 620. As further shown in FIGS.

6A, 6B, and 6C, device 600 can include thermal slug 650 and shell 660. In some aspects, device 600 can be referred to as a connector, a connection device, or a host device.

Biasing mechanism 620 can comprise a material that can be compressed and/or expanded, which can allow it to adjust to a memory card when it is inserted into device 600. For example, biasing mechanism 620 can comprise foam or a TIM capable of being compressed or expanded.

As shown in FIG. 6C, biasing mechanism 620 can extend through the connector housing 610 and into the window 618. By doing so, biasing mechanism can interfere with a memory card that is inserted into the housing opening 616. When the card is inserted into housing 610, the card can apply a force on the biasing mechanism 620, such that the biasing mechanism 620 can compress and/or expand upon card insertion. Accordingly, biasing mechanism 620 can increase the thermal contact with an inserted card by increasing the contact area between the components. In some aspects, when a card is inserted into housing 610, biasing mechanism 620 can be compressed toward slug 650, or may compress in one dimension (e.g., vertically in this example) and expand in another dimension (e.g., horizontally in this example) so the expansion of the body of the biasing mechanism 620 enables contact or increases a contact area with the slug 650 or another thermal management system component. By doing so, biasing mechanism 620 can increase the thermal contact between the inserted card and the slug 650.

Biasing mechanism 620 can have two different positions, a first position, e.g., a nominal resting position when a card is not inserted into housing 610, and a second position, e.g., when a card is inserted into housing 610 and the biasing mechanism 620 compresses and/or expands upon insertion. Accordingly, an inserted card can bias the biasing mechanism 620 into the second position. In some aspects, biasing mechanism 620 can act as a suspension system and/or conform to the inserted card. Also, biasing mechanism 620 can deform or be biased toward slug 650 when the card is inserted into the housing. So the biasing mechanism 620 can be compacted by the insertion of the card, which in turn allows for good thermal contact with the slug 650, and correspondingly a good thermal dissipation.

Biasing mechanism 620 can be on the top or bottom of connector housing 610. By doing so, biasing mechanism 620 can bias an inserted card against the top or bottom of the connector shell 612. As such, the biasing or elastic mechanism 620 can be on one or both sides of housing 610. In some aspects, the biasing mechanism can connect to a thermal management system on either side of the housing 610.

In some aspects, shell 660 can hold or mount slug 650 to housing 610. Additionally, shell 660 can include a thermally conductive material, such that shell 660 can help with heat dissipation in device 600. Shell 660 can also help to reduce electrical noise or radiation from signals high speed signals, e.g., EMI leakage. Accordingly, shell 660 can include an EMI containment capability. In some aspects, window 618 may cause EMI leakage to occur, such that shell 660 can contain or reduce the EMI leakage, e.g., from the housing 610. Shell 660 can also help to close off any gaps in other components.

As indicated herein, an example apparatus can include a device for reading from and/or writing to a removable storage card, e.g., device 100, device 400, device 500, and device 600. The apparatus can include a housing including a wall defining a housing opening sized to receive a removable storage card, as described in connection with the examples in FIGS. 1A-1C, 2A, 2B, 3, 4A, 4B, 5A, 5B, and 6A-6C. For example, device 100 includes a housing 110 including a wall defining a housing opening 116 sized to receive a removable storage card 200. The apparatus can also include a thermal management system attached to at least a part of the wall of the housing, as described in connection with the examples in FIGS. 1A-1C, 2A, 2B, 3, 4A, 4B, 5A, 5B, and 6A-6C. For example, thermal management system 320 is attached to at least a part of the wall of the housing 110.

Also, the apparatus can include a biasing mechanism interoperable with the housing and configured to bias a card surface of the removable storage card into thermal communication with the thermal management system in response to insertion of the removable storage card into the housing opening, as described in connection with the examples in FIGS. 1A-1C, 2A, 2B, 3, 4A, 4B, 5A, 5B, and 6A-6C. For example, biasing mechanism 120 can be interoperable with the housing 110 and configured to bias a card surface of the removable storage card 200 into thermal communication with the thermal management system 320 in response to insertion of the removable storage card into the housing opening 116.

In some aspects, the biasing mechanism can be movable between a first position and a second position, as described in connection with the examples in FIGS. 1A-1C, 2A, 2B, 3, 4A, 4B, 5A, 5B, and 6A-6C. For example, biasing mechanism 120 can be movable between a first position and a second position. Also, the biasing mechanism can be configured to move from the first position to the second position in response to the insertion of the removable storage card into the housing opening, and where the biasing mechanism in the second position can be configured to apply a biasing force in a direction of the thermal management system to the removable storage card, as described in connection with the examples in FIGS. 1A-1C, 2A, 2B, 3, 4A, 4B, 5A, 5B, and 6A-6C. For example, biasing mechanism 120 can be configured to move from the first position to the second position in response to the insertion of the removable storage card 200 into the housing opening 116, and where the biasing mechanism 120 in the second position can be configured to apply a biasing force in a direction of the thermal management system 320 to the removable storage card 200.

In some aspects, the wall of the housing or a surface of the thermal management system can be configured to contact the card surface of the removable storage card in response to insertion of the removable storage card into the housing opening, as described in connection with the examples in FIGS. 1A-1C, 2A, 2B, 3, 4A, 4B, 5A, 5B, and 6A-6C. For example, wall of the housing 110 or a surface of the thermal management system 320 can be configured to contact the card surface of the removable storage card 200 in response to insertion of the removable storage card 200 into the housing opening 116. Further, the biasing mechanism can include one or more elastic members configured to apply a biasing force to the removable storage card in response to the insertion of the removable storage card into the housing opening, where the biasing force can be sufficient to maintain the thermal communication between the card surface and the thermal management system, as described in connection with the examples in FIGS. 1A-1C, 2A, 2B, 3, 4A, 4B, 5A, 5B, and 6A-6C. For example, the biasing mechanism 120 can include one or more elastic members 122 configured to apply a biasing force to the removable storage card 200 in response to the insertion of the removable storage card 200 into the housing opening 116, where the biasing force can be sufficient to maintain the thermal communication between the card surface and the thermal management system 320.

Also, the wall of the housing can define a longitudinal chamber that extends within the housing from a first end corresponding to the housing opening to a second end opposite the housing opening, where the biasing mechanism can include a biasing surface positioned within the longitudinal chamber, where the biasing surface can be configured to move from a first position to a second position in response to the insertion of the removable storage card into the housing opening, and where the biasing surface in the second position can be configured to apply a biasing force in a direction of the thermal management system to the removable storage card, as described in connection with the examples in FIGS. 1A-1C, 2A, 2B, 3, 4A, 4B, 5A, 5B, and 6A-6C. For example, the wall of the housing 110 can define a longitudinal chamber that extends within the housing 110 from a first end corresponding to the housing opening 116 to a second end opposite the housing opening 116, where the biasing mechanism 120 can include a biasing surface positioned within the longitudinal chamber, where the biasing surface can be configured to move from a first position to a second position in response to the insertion of the removable storage card 200 into the housing opening 116, and where the biasing surface in the second position can be configured to apply a biasing force in a direction of the thermal management system 320 to the removable storage card 200.

Moreover, the wall of the housing can define a longitudinal chamber that extends within the housing from a first end corresponding to the housing opening to a second end opposite the housing opening, wherein the biasing mechanism includes a first elastic member spaced apart from a second elastic member between the first end and the second end of the longitudinal chamber, wherein the first elastic member includes a first biasing surface and the second elastic member includes a second biasing surface, wherein the first biasing surface and the second biasing surface are movable from a first position to a second position in response to the insertion of the removable storage card into the housing opening, and wherein the first biasing surface and the second biasing surface in the second position are configured to apply a first biasing force and a second biasing force, respectively, in a direction of the thermal management system to the removable storage card, as described in connection with the examples in FIGS. 1A-1C, 2A, 2B, 3, 4A, 4B, 5A, 5B, and 6A-6C. For example, the wall of the housing 110 can define a longitudinal chamber that extends within the housing 110 from a first end corresponding to the housing opening 116 to a second end opposite the housing opening 116, where the biasing mechanism 120 can include a first elastic member 122 spaced apart from a second elastic member 122 between the first end and the second end of the longitudinal chamber, wherein the first elastic member 122 can include a first biasing surface and the second elastic member 122 can include a second biasing surface, wherein the first biasing surface and the second biasing surface are movable from a first position to a second position in response to the insertion of the removable storage card 200 into the housing opening 116, and wherein the first biasing surface and the second biasing surface in the second position are configured to apply a first biasing force and a second biasing force, respectively, in a direction of the thermal management system 320 to the removable storage card 200. In some aspects, the first biasing force and the second biasing force can be different, as described in connection with the examples in FIGS. 1A-1C, 2A, 2B, 3, 4A, 4B, 5A, 5B, and 6A-6C. In further aspects, the first biasing force and the second biasing force on the removable storage card 200 can be configured to movably position the card surface of the removable storage card 200 into the thermal communication with the thermal management system 320, as described in connection with the examples in FIGS. 1A-1C, 2A, 2B, 3, 4A, 4B, 5A, 5B, and 6A-6C.

Additionally, the thermal management system 320 can include at least one of a TIM, a thermal spreader, or a heat sink, as described in connection with the examples in FIGS. 1A-1C, 2A, 2B, 3, 4A, 4B, 5A, 5B, and 6A-6C. In some aspects, the heat sink can comprise a heat pipe or a vapor chamber, as described in connection with the examples in FIGS. 1A-1C, 2A, 2B, 3, 4A, 4B, 5A, 5B, and 6A-6C. Further, the housing 110 can include a connector shell 112 and a connector frame 114, where the connector frame 114 includes one or more signal or I/O pins 140 configured to align with one or more corresponding signal or I/O pins 235 of the removable storage card 200, as described in connection with the examples in FIGS. 1A-1C, 2A, 2B, 3, 4A, 4B, 5A, 5B, and 6A-6C. Also, the thermal management system can include a thermal slug 550 attached to at least the part of the wall of the housing 510 to define a thermal interface for the thermal communication with the thermal management system, as described in connection with the examples in FIGS. 1A-1C, 2A, 2B, 3, 4A, 4B, 5A, 5B, and 6A-6C. Further, the wall of the housing 510 can define a longitudinal chamber that extends within the housing 510 from a first end corresponding to the housing opening 516 to a second end opposite the housing opening 516, where the wall of the housing adjacent to the thermal management system can further include an internal wall that defines a window 518 that opens to the longitudinal chamber, where the thermal slug 550 can be positioned within the window 518 and configured to contact the card surface of the removable storage card 200 upon the insertion into the housing opening 516, as described in connection with the examples in FIGS. 1A-1C, 2A, 2B, 3, 4A, 4B, 5A, 5B, and 6A-6C.

In some aspects, the thermal management system can further include a cage structure 560 that extends around at least a portion of a perimeter of the thermal slug 550 and that connects the thermal slug 550 to the housing 510, as described in connection with the examples in FIGS. 1A-1C, 2A, 2B, 3, 4A, 4B, 5A, 5B, and 6A-6C. Also, the thermal management system can include a fan configured to move air across the thermal management system, as described in connection with the examples in FIGS. 1A-1C, 2A, 2B, 3, 4A, 4B, 5A, 5B, and 6A-6C.

As indicated herein, an example apparatus can include a removable storage card, e.g., removable storage card 200. The apparatus can include a card frame 210 including an insertion end and a non-insertion end, where the card frame 210 can comprise a first material having a first thermal conductivity, as described in connection with the examples in FIGS. 1A-1C, 2A, 2B, 3, 4A, 4B, 5A, 5B, and 6A-6C. Also, the apparatus can include an end cap 220 on the non-insertion end of the card frame 210, where the end cap 220 comprises a second material having a second thermal conductivity that is less than the first thermal conductivity, as described in connection with the examples in FIGS. 1A-1C, 2A, 2B, 3, 4A, 4B, 5A, 5B, and 6A-6C.

Further, the apparatus can include a PCB 234 mounted within the card frame 210, where the PCB 234 includes a circuit 239, one or more signal or input/output (I/O) pins 235 adjacent to the insertion end of the card frame 210 and electrically connected to the circuit 239, and a data storage device 234 electrically connected to the circuit 239, wherein the data storage device 234 is operable to generate heat, as described in connection with the examples in FIGS. 1A-1C, 2A, 2B, 3, 4A, 4B, 5A, 5B, and 6A-6C. Also, the apparatus can include a TIM 233 positioned inside of the card frame 210 and adjacent to the data storage device 234, where the TIM 233 is configured to conduct the heat from the data storage device 234 to the card frame 210, as described in connection with the examples in FIGS. 1A-1C, 2A, 2B, 3, 4A, 4B, 5A, 5B, and 6A-6C. In some aspects, the card frame 210 can longitudinally extend a first length between the insertion end and the non-insertion end, where the PCB 234 longitudinally can extend a second length between a first PCB end and a second PCB end, where a difference in the second length relative to the first length can define an air gap at the non-insertion end of the card frame 210, where the end cap 220 can at least partially overlap the air gap, as described in connection with the examples in FIGS. 1A-1C, 2A, 2B, 3, 4A, 4B, 5A, 5B, and 6A-6C.

The subject matter described herein can be implemented to realize one or more benefits or advantages. For instance, the present disclosure can more optimally and effectively dissipate heat from a removable storage card. The described techniques can also be used by memory cards or removable storage devices form a heat path throughout the device for thermal dissipation. The present disclosure can also improve the thermal contact of a removable storage card with a thermal management system, e.g., by biasing the card toward the thermal management system. The present disclosure can save time, effort, and costs by utilizing the aforementioned features of a memory card or host device.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different removable storage technologies, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like, which can collectively be referred to as "elements."

Throughout this disclosure, the preferred embodiment and examples illustrated should be considered as exemplars, rather than as limitations on the present disclosure. As used herein, the term "invention," "device," "apparatus," "method," "disclosure," "present invention," "present device," "present apparatus," "present method," or "present disclosure" refers to any one of the embodiments of the disclosure described herein, and any equivalents. Furthermore, reference to various feature(s) of the "invention," "device," "apparatus," "method," "present invention," "present device," "present apparatus," or "present method" throughout this document does not mean that all claimed embodiments or methods must include the referenced feature(s).

When an element or feature is referred to as being "on" or "adjacent" to another element or feature, it can be directly on or adjacent the other element or feature or intervening elements or features may also be present. In contrast, when an element is referred to as being "directly on" or extending "directly onto" another element, there are no intervening elements present. Additionally, when an element is referred to as being "connected" or "coupled to" another element, it can be directly connected or coupled to the other element or intervening elements may be present. In contrast, when an element is referred to as being "directly connected" or "directly coupled" to another element, there are no intervening elements present.

Additionally, relative terms such as "inner," "outer," "upper," "top," "above," "lower," "bottom," "beneath," "below," and similar terms, may be used herein to describe a relationship of one element to another. Terms such as "higher," "lower," "wider," "narrower," and similar terms, may be used herein to describe angular relationships. These terms are intended to encompass different orientations of the elements or system in addition to the orientation depicted in the figures.

Although the terms first, second, third, etc., may be used herein to describe various elements, components, regions, and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present disclosure. As used herein, the term "and/or" includes any and all combinations of one or more of the associated list items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. For example, when the present specification refers to "an assembly," this language encompasses a single assembly or a plurality or array of assemblies. Further, the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim all that comes within the scope and spirit of the claims.

In accordance with this disclosure, the term "or" may be interpreted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

Various examples have been described. These and other examples are within the scope of the following claims.

What is claimed is:

1. A device for reading from and/or writing to a removable storage card, comprising:
a housing including a wall defining a housing opening sized to receive a removable storage card;
a thermal management system attached to at least a part of the wall of the housing; and
a biasing mechanism interoperable with the housing and configured to bias a card surface of the removable storage card into thermal communication with the thermal management system in response to insertion of the removable storage card into the housing opening, wherein the biasing mechanism includes a first elastic member proximate to the housing opening and a second elastic member distal to the housing opening, wherein a first biasing force of the first elastic member is different than a second biasing force of the second elastic member; and
wherein the wall of the housing defines a longitudinal chamber that extends within the housing from a first end corresponding to the housing opening to a second end opposite the housing opening, wherein the biasing mechanism includes a biasing surface positioned within the longitudinal chamber.

2. The device of claim 1, wherein the biasing mechanism is movable between a first position and a second position.

3. The device of claim 2, wherein the biasing mechanism is configured to move from the first position to the second position in response to the insertion of the removable storage card into the housing opening, and wherein the biasing mechanism in the second position is configured to apply a biasing force in a direction of the thermal management system to the removable storage card.

4. The device of claim 1, wherein the wall of the housing or a surface of the thermal management system is configured to contact the card surface of the removable storage card in response to insertion of the removable storage card into the housing opening.

5. The device of claim 1, wherein the biasing mechanism includes one or more elastic members configured to apply a biasing force to the removable storage card in response to the insertion of the removable storage card into the housing opening, wherein the biasing force is sufficient to maintain the thermal communication between the card surface and the thermal management system.

6. The device of claim 1, wherein the biasing mechanism includes a biasing surface positioned within the longitudinal chamber, wherein the biasing surface is configured to move from a first position to a second position in response to the insertion of the removable storage card into the housing opening, and wherein the biasing surface in the second position is configured to apply a biasing force in a direction of the thermal management system to the removable storage card.

7. The device of claim 1, wherein the first elastic member includes a first biasing surface and the second elastic member includes a second biasing surface, wherein the first biasing surface and the second biasing surface are movable from a first position to a second position in response to the insertion of the removable storage card into the housing opening, and wherein the first biasing surface and the second biasing surface in the second position are configured to apply a first biasing force and a second biasing force, respectively, in a direction of the thermal management system to the removable storage card.

8. The device of claim 7, wherein the first biasing force and the second biasing force on the removable storage card are configured to movably position the card surface of the removable storage card into the thermal communication with the thermal management system.

9. The device of claim 1, wherein the thermal management system includes at least one of a thermal interface material (TIM), a thermal spreader, or a heat sink.

10. The device of claim 9, wherein the heat sink comprises a heat pipe or a vapor chamber.

11. The device of claim 1, wherein the housing includes a connector shell and a connector frame, wherein the connector frame includes one or more signal or input/output (I/O) pins configured to align with one or more corresponding signal or I/O pins of the removable storage card.

12. The device of claim 1, wherein the thermal management system includes a thermal slug attached to at least the part of the wall of the housing to define a thermal interface for the thermal communication with the thermal management system.

13. The device of claim 12, wherein the wall of the housing adjacent to the thermal management system further includes an internal wall that defines a window that opens to the longitudinal chamber, wherein the thermal slug is positioned within the window and configured to contact the card surface of the removable storage card upon the insertion into the housing opening.

14. The device of claim 13, wherein the thermal management system further includes a cage structure that extends around at least a portion of a perimeter of the thermal slug and that connects the thermal slug to the housing.

15. The device of claim 1, wherein the thermal management system includes a fan configured to move air across the thermal management system.

16. A data storage system, the system comprising:
a card reader including:
a housing including a wall defining a housing opening sized to receive a removable storage card, wherein the wall of the housing defines a longitudinal chamber that extends within the housing from a first end corresponding to the housing opening to a second end opposite the housing opening,
a thermal management system attached to at least a part of the wall of the housing, and
a biasing mechanism interoperable with the housing and configured to bias a card surface of the removable storage card into thermal communication with the thermal management system in response to insertion of the removable storage card into the housing opening, wherein the biasing mechanism includes a first elastic member proximate to the housing opening and a second elastic member distal to the housing opening, wherein a first biasing force of the first elastic member is different than a second biasing force of the second elastic member, wherein the biasing mechanism includes a biasing surface positioned within the longitudinal chamber; and
the removable storage card positioned in the housing with the card surface in contact with the thermal management system.

17. The data storage system of claim 16, wherein the removable storage card includes:
- a card frame including an insertion end and a non-insertion end, wherein the card frame comprises a first material having a first thermal conductivity;
- a printed circuit board (PCB) mounted within the card frame, wherein the PCB includes a circuit, one or more signal or input/output (I/O) pins adjacent to the insertion end of the card frame and electrically connected to the circuit, and a data storage device electrically connected to the circuit, wherein the data storage device is operable to generate heat; and
- a thermal interface material (TIM) positioned inside of the card frame and adjacent to the data storage device, wherein the TIM is configured to conduct the heat from the data storage device to the card frame.

18. The data storage system of claim 17, wherein the card frame longitudinally extends a first length between the insertion end and the non-insertion end, wherein the PCB longitudinally extends a second length between a first PCB end and a second PCB end, wherein a difference in the second length relative to the first length defines an air gap at the non-insertion end of the card frame, wherein the end cap at least partially overlaps the air gap.

19. The data storage system of claim 17, wherein the removable storage card further includes an end cap on the non-insertion end of the card frame, wherein the end cap comprises a second material having a second thermal conductivity that is less than the first thermal conductivity to limit heat transfer from the PCB to the end cap.

* * * * *